(12) United States Patent
Lu et al.

(10) Patent No.: US 6,650,383 B1
(45) Date of Patent: Nov. 18, 2003

(54) BAND-SHIFTED LIQUID CRYSTAL STRUCTURE FOR PROJECTION OF IMAGES WITHOUT SPECTRAL DISTORTION

(75) Inventors: Minhua Lu, Mohegan Lake, NY (US); Alan Edward Rosenbluth, Yorktown Heights, NY (US); Kei-Hsiung Yang, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,272

(22) Filed: May 25, 2000

Related U.S. Application Data

(60) Provisional application No. 60/136,031, filed on May 26, 1999.

(51) Int. Cl.⁷ .................................... G02F 1/1347
(52) U.S. Cl. ...................................................... 349/75
(58) Field of Search ........................ 349/5–9, 147, 349/75–76

(56) References Cited

U.S. PATENT DOCUMENTS

| | | | |
|---|---|---|---|
| 4,408,839 A | | 10/1983 | Wiener-Avnear ............ 350/347 |
| 4,436,379 A | | 3/1984 | Funada et al. .............. 350/347 |
| 4,466,702 A | * | 8/1984 | Wiener-Avnear et al. ... 350/347 |
| 4,952,029 A | | 8/1990 | Hayashi et al. ............. 350/335 |
| 5,155,608 A | | 10/1992 | Hatano ........................ 359/53 |
| 5,245,451 A | * | 9/1993 | Wu et al. .................... 359/55 |
| 5,921,650 A | | 7/1999 | Doany et al. ................ 353/37 |
| 5,973,759 A | * | 10/1999 | Itoh et al. ...................... 349/5 |
| 6,028,654 A | * | 2/2000 | Tanaka et al. .............. 349/147 |
| 6,122,028 A | * | 9/2000 | Gilmour et al. ............ 349/117 |

OTHER PUBLICATIONS

U.S. patent application Ser. No. 09/085,065, K.C. Ho et al., "Lightvalve Projection System in which Red, Green, and Blue Image Subpixels are Projected from Two Lightvalves and Recombined Using Total Reflection Prisms", filed May 27, 1998.

A.E. Rosenbluth et al., "Contrast Properties of Reflective Liquid Crystal Light Valves in Projection Displays," IBM J. Res. Develop., vol. 42, No. 3/4, pp. 359–386, May/Jul. 1998.

* cited by examiner

Primary Examiner—Robert H. Kim
Assistant Examiner—Timothy L Rude
(74) Attorney, Agent, or Firm—Robert M. Trepp

(57) ABSTRACT

A reflective liquid crystal lightvalve for modulating the polarization of incident light within a specified band of wavelengths into on and off states, comprises: (i) a pixelated reflective backplane; (ii) a first liquid crystal layer, positioned proximate the pixelated reflective backplane, the first liquid crystal layer being tuned in the off state to switch incident light at the center of the specified band of wavelengths into a state that is not fully off; and (iii) a second liquid crystal layer, positioned proximate the first liquid crystal layer wherein the first liquid crystal layer is positioned between the second liquid crystal layer and the pixelated reflective backplane, the second liquid crystal layer having a birefringence which, at a given depth within its thickness, is substantially equal and opposite to a birefringence of a layer within the first liquid crystal layer that is located at a matching distance from a midplane separating the first and second liquid crystal layers.

25 Claims, 20 Drawing Sheets

(LINEAR SCALE)

(LOG SCALE)

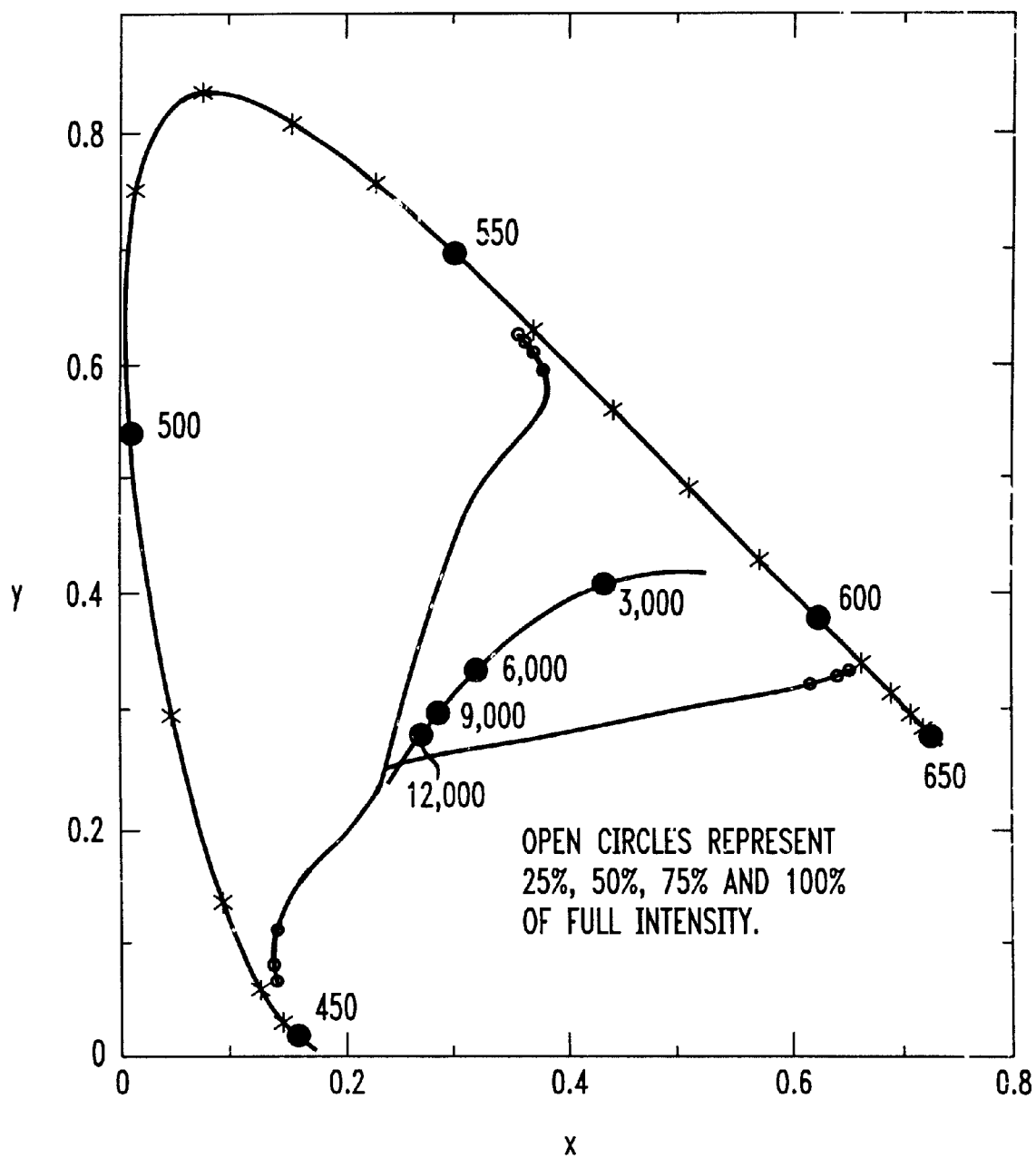

BLACK STATE vs CELL ERROR (1st), COR ERROR (2nd)

BAND-SHIFTED LIQUID CRYSTAL STRUCTURE FOR PROJECTION OF IMAGES WITHOUT SPECTRAL DISTORTION

CROSS REFERENCE TO RELATED APPLICATIONS

The present application claims priority to the U.S. provisional patent application identified by Ser. No. 60/136,031 filed on May 26, 1999, the disclosure of which is incorporated by reference herein.

FIELD OF THE INVENTION

The present invention generally relates to lightvalves and, more particularly, to improved reflective twisted nematic liquid crystal (LC) lightvalves and systems employing same.

BACKGROUND OF THE INVENTION

Reflective lightvalves are becoming widely used in projection displays. Such lightvalves can be decreased in size without incurring a penalty in pixel aperture, allowing a corresponding shrinkage in size and cost of the entire projection system. Reflective lightvalves based on twisted nematic liquid crystal (TNLC) layers, such as the 45° (degree) twist or 54° twist modes, make use of well developed LC technology, and with relatively modest driving voltages can provide a reasonably satisfactory optical response when reproducing black, white or intermediate grayshaded image regions. A TNLC layer of twist angle α and birefringence Δn which is set to a thickness d satisfying:

$$d = (\lambda/\Delta n)\sqrt{m^2 - (\alpha/\pi)^2} \quad (1)$$

will provide reasonably high contrast within a band of wavelengths centered at λ; in most cases this band is wide enough to project a single primary color (i.e., red, green, or blue), allowing the full image to be projected from three lightvalves. Minimum suitable thickness is obtained by setting m=1 in equation (1); the choice m=1 thus minimizes the drive voltage that must be supplied when projecting image regions of maximum brightness.

Though the intrinsic contrast of the TNLC lightvalve is in itself usually acceptable over a single color band, the contrast of the full projection system is almost always poorer than that of the lightvalve alone, due to an interaction between the TNLC lightvalve and the projection optics, discussed further below. In demanding applications, even the intrinsic contrast of the TNLC lightvalve in isolation may be marginal; however there is a known method for improving the intrinsic crossed polarizer transmission of the TNLC layer. U.S. Pat. No. 4,408,839, issued to Wiener-Avnear and entitled "Twisted Nematic Liquid Crystal Light Valve with Birefringence Compensation," the disclosure of which is incorporated by reference herein, discloses a TNLC corrector layer which the illumination traverses before reaching the TNLC lightvalve; this corrector compensates the black state of the lightvalve. The twist within the TNLC corrector is chosen in such a way that the LC molecules along the exit surface of the corrector are perpendicular to the LC molecules at the adjoining entrance surface of the lightvalve. These two monomolecular sublayers then have parallel birefringences of opposite sign, and so cancel. The two TN layers are given opposite twists of equal magnitude, which means that if one considers successive additional pairs of sublayers (one from each LC layer, selecting the two sublayers to be at equal distances from the adjoining exit and entrance faces), the two sublayers in successive pairs continue to cancel each other in the above fashion (if dΔN for the two layers is the same). The Wiener-Avnear patent discloses that the intrinsic TNLC black state intensity is thus made zero at all wavelengths. Other two layer transmission lightvalves have been disclosed in which the dΔN product or twist angle is not the same in the two layers.

However, while the imperfect intrinsic black state of the TNLC lightvalve is correctable by the known double layer techniques, the prior art reflective lightvalve exhibits a number of other limitations. Examples of these limitations will be described below in the subsections (1) through (8).

(1) The spectral width of the high contrast zone is not adequate to project all three color bands from a single lightvalve, hence three lightvalves are required. While use of three lightvalves has the advantage of maximizing image brightness, there are applications where adequate brightness could be achieved at lower cost from a single lightvalve (or two lightvalves), if a single lightvalve were capable of projecting all three colors.

(2) A particular method for projecting multiple colors from a single lightvalve is to sequentially project each color component at a sufficiently high rate that the eye perceives the three components to be simultaneous. However, it is difficult to switch TNLC lightvalves rapidly enough to achieve a flicker free image in sequential mode. Switching time is approximately quadratic in the cell gap d. The equation (1) contrast condition sets a minimum attainable thickness d for the TNLC lightvalve, and hence a minimum switching time. Once an LC is chosen with the largest possible ΔN, and the twist angle a is set to a sufficiently large value that high bright state reflectivity is obtained together with an adequately broad band of high contrast, the cell gap d of the TNLC lightvalve is then fixed by equation (1).

(3) Different cell gaps must be assigned to the red, green, and blue lightvalves, as per equation (1). Since switching speed is then different in the three color channels, the projected image of a moving object of mixed color (e.g., white) will exhibit different colors in its leading and lagging edges.

(4) These constraints on voltage and cell gap indicate that an LC with the largest possible birefringence ΔN should be chosen. This may rule out the use of LCs with other desirable properties, such as fluorinated LCs, which have low sensitivity to UV (ultraviolet) light.

(5) Small errors in cell gap thickness d can degrade the quality of the black state. The optical effect is governed by changes in the dimensionless parameter β defined as:

$$\beta \equiv \pi \frac{d\Delta n}{\lambda}. \quad (2)$$

In principle, a small error in cell gap can be compensated by rotating the lightvalve slightly. The orientation of minimum black state reflectivity is given by:

$$\Theta' = a \frac{\tan\gamma}{\gamma} \quad (3)$$

where $$\lambda = \sqrt{\alpha^2 + \beta^2}. \quad (4)$$

Unfortunately, errors in the cell gap are often the result of quasi-random process variations, and cannot be determined until the lightvalve is actually fabricated. At that point, it is no longer possible to rotate the lightvalve because it must remain aligned with the desired image orientation and with the lightvalves of the other two color channels.

(6) Even in the absence of cell gap errors, the TNLC lightvalve does not provide ideal contrast. Most commonly, these LVs (lightvalves) are used in projection systems where the LV is illuminated through a polarizing beamsplitter (PBS) and quarterwaveplate (QWP); in such systems the intrinsic black level is given by:

$$B_{System} = \left(\frac{2a\beta\sin^2\gamma}{\gamma^2}\right)^2 + \frac{NA^2}{n^2}\left(\beta\frac{\sin2\gamma}{\gamma}\right)^2, \quad (5)$$

where NA is the numerical aperture of the projection optics (at the lightvalve), and n is the PBS substrate refractive index. The cell gap d is usually chosen to satisfy equation (1) at a single (usually central) wavelength in the color band. At this central wavelength, both terms in equation (5) are zero, but at other wavelengths, both are non-zero, and projected black regions of the image are not completely dark. When displaying darker shades of a single color (i.e., shades where one color is set to a reflectivity slightly above black state while the other two are set nominally at zero), the residual reflectivity of the two black state lightvalves causes the image color in the driven channel to be significantly desaturated, i.e., to be washed out.

As discussed above, the first term in equation (5) is intrinsic to the TNLC lightvalve itself. The second term arises from a birefringence-like effect in the TNLC layer. The QWP phase shift precisely eliminates compound angle depolarization at the single wavelength satisfying equation (1) above, but at other wavelengths the TNLC layer introduces its own phase shift which is not matched by the QWP. This phase offset is linear in small wavelength departures from the equation (1) condition. The retardance of the corrective waveplate could be set to a value other than 90°, but it is the strong dispersion in the offset phase that makes compound angle correction imperfect. The resulting black state intensity is quadratic in wavelength departure from the equation (1) centerpoint, and is also quadratic in the optical system NA. There is a trend in the projection display industry towards larger NAs to increase the light collection power of projection optics; unfortunately the equation (5) background effect conflicts with this goal.

(7) a. The e-field polarization at the lightvalve backplane is approximately linear when the reflective TN (twisted nematic) lightvalve is in black state, but the polarization is rotated relative to the input direction. The rotation angle is roughly equal to the twist angle a, which might for example be 45°. The topography of the backplane typically comprises vertical and horizontal mirror edges that follow the row, column layout of pixels in the projected image. In order to avoid depolarization from scattering off these topographical edges, it would be preferable that the polarization at the backplane be horizontal or vertical, instead of, e.g., 45°.

b. When the wavelength is offset slightly from the center wavelength, the polarization at the mirror backplane remains linear to first order, but it is rotated out of alignment with the LC molecules at the backplane, i.e., at offcenter wavelengths the polarization is rotated slightly away from the, e.g., 45° orientation of the LC molecules. Ideally, the backplane would reflect the light back into the LC in this same slightly rotated linear polarized orientation. Such a dispersive rotation of polarization would then cancel out in the return pass through the LC. However, if there is a phase shift upon reflection from the backplane that is dependent on the incident index, such a rotation of the transmitted e-field relative to the birefringent LC can cause the light to be reflected in an elliptical polarization (due to the anisotropic LC index), and such ellipticity will not cancel in the return pass through the LC.

c. The most common manufacturing process for establishing the orientation of the LC molecules at the backplane is through rubbing of an alignment layer. This rubbing process creates artifacts when the lightvalve cell gap is maintained by spacer posts placed in the boundaries between mirror pixels. The principle advantage of spacer post technology is that it provides very accurate control of the cell gap; however a disadvantage is that spacer posts perturb the alignment of nearby LC. Incident light whose polarization is altered by that portion of the disturbed LC which is immediately adjacent to the posts will be absorbed by the low reflectivity layer which separates the pixel mirrors; thus in regions very close to the posts, the disturbed LC has little effect on the displayed image. Unfortunately, the region of disturbed LC may be considerably extended (~10 microns or m) in the direction of alignment layer rubbing. In the known reflective TN lightvalves, this rubbing direction is at an angle such as 45° to the dark interpixel boundaries, creating visible LC disturbance in the regions over the mirrors.

Thus, for at least the above three reasons, it would be preferable to have the e-field at the backplane be aligned with both the LC molecules and the edges of the pixel topography, even at wavelengths that depart from the center wavelength defined by equation (1).

(8) To display grey image shades, a moderate voltage is applied to the TN lightvalve. Roughly speaking, the effect of applied voltage is to reduce ΔN by increasing the tilt of the LC molecules against the substrate surfaces. The cell gap d is set such that when V=0, equation (1) is satisfied at some wavelength in the center of the color band, i.e., when V=0, the LV gives the blackest response at band center. However, after ΔN has been reduced by a small applied voltage, equation (1) will be satisfied at a shorter wavelength than in the V=0 black state. At low voltages, the LV thus switches on first at longer wavelengths in the color band. For qualitative purposes, we can estimate the response using the first term of equation (5), which predicts that the reflected intensity increases from a level near zero to an extremum near unity as β is driven from an initial value of about 3 down to a value of about 1.1. This is illustrated in FIGS. 1A (linear scale) and 1B (log scale) for the case where α=45°. Since β is inversely proportional to λ, the longer wavelengths in the band reach the bright state extremum first. After longer wavelengths reach this extremum, further voltage increases cause the relative shortwave content of the reflected spectrum to be restored (as shorter wavelengths in the band are also driven to maximum), until the overall reflectance maximum is reached. This is illustrated in FIG. 2.

The combined effect of the non-uniform spectral response in the black state (subsection (6) above) and at intermediate shades of gray (subsection (8) above) causes the color content of most image regions to be distorted. Image chromaticity at an intermediate gray shade of a single color can differ appreciably from that of the full intensity primary. FIG. 3 plots the color coordinates of red, green, and blue image regions over a continuous range of intensities.

FIGS. 4A and 4B are diagrams illustrating the structure of a prior art lightvalve. As shown in FIG. 4A, the liquid crystal (LC) molecules comprising layer 4 are oriented by alignment layers 5 and 7. Topglass 1 and pixelated substrate 6 hold LC layer 4 in place. The cutaway, shown in FIG. 4B, shows the structure with topglass 1 removed for clarity.

Spacers 11 maintain the thickness of LC layer 4. The LC molecules at the topglass-side of layer 4 (indicated schematically by arrow 2) are oriented parallel to the edges of mirror pixels 10. Arrow 3 indicates schematically that the LC molecules at the backplane are oriented at an angle such as 45 degrees relative to the edges of pixels 10. The arrows represent the projection of the LC molecules onto planes parallel to the substrate, whereas the molecules may actually exhibit a small pre-tilt against the substrate. It should be noted that FIG. 4B is not drawn to scale. Sixteen pixels are shown; each is typically 10 μm (micrometers or microns) to 20 μm in size. The complete light valve contains approximately $10^6$ pixels. Typical LC thickness is about 3 μm, and topglass thickness is about 1 mm (millimeter).

Despite the limitations described above, the prior art reflective TN lightvalve achieves reasonable performance using very reliable TNLC technology; technology which has been refined over a period of decades. What is needed is a reflective lightvalve that makes use of twisted nematic liquid crystal technology without suffering the above limitations.

SUMMARY OF THE INVENTION

The present invention provides an improved liquid crystal (LC) structure for lightvalves that makes use of twisted nematic liquid crystal technology without suffering the above and other limitations. In one aspect of the invention, a reflective liquid crystal lightvalve for modulating the polarization of incident light within a specified band of wavelengths into on and off states, comprises: (i) a pixelated reflective backplane; (ii) a first liquid crystal layer, positioned proximate the pixelated reflective backplane, the first liquid crystal layer being tuned in the off state to switch incident light at the center of the specified band of wavelengths into a state that is not fully off; and (iii) a second liquid crystal layer, positioned proximate the first liquid crystal layer wherein the first liquid crystal layer is positioned between the second liquid crystal layer and the pixelated reflective backplane, the second liquid crystal layer having a birefringence which, at a given depth within its thickness, is substantially equal and opposite to a birefringence of a layer within the first liquid crystal layer that is located at a matching distance from a midplane separating the first and second liquid crystal layers. Preferably, the first liquid crystal layer is a twisted nematic layer that is tuned in the off state to fully switch off light of a wavelength that is shorter than the central wavelength of the specified band of wavelengths. Further, preferably, the orientation of liquid crystal molecules in a plane at a given depth of the second liquid crystal layer, when projected onto said plane, is substantially perpendicular to the projected orientation of liquid crystal molecules of the first liquid crystal layer in a plane that is located at a matching distance from a midplane separating the first and second liquid crystal layers.

In another aspect of the invention, an LC structure comprises two LC layers, in which each LC layer is band-shifted to a dΔN value producing maximum contrast in the layer at a wavelength shorter than the central operating wavelength for the combined structure, wherein one of the LC layers is undriven and can be rotated relative to the driven layer.

In yet another aspect of the invention, a reflective LC lightvalve comprises two twisted nematic LC layers and a quarterwave retarder, each twisted nematic layer being set to a thickness that provides, from the individual layer, an optimum projected black state at shorter wavelengths than the wavelength band of interest, thus providing, from the combined tri-layer structure, a spectral response that, within the wavelength band of interest, is improved at all driving voltages.

Various novel optical systems utilizing one or more of the inventive lightvalve structures are also described in detail herein. However, given the inventive teachings, one of ordinary skill in the art will realize other applications and systems.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a graph illustrating a chromaticity response associated with a conventional lightvalve;

DETAILED DESCRIPTION OF PREFERRED EMBODIMENTS

Figure 1A:
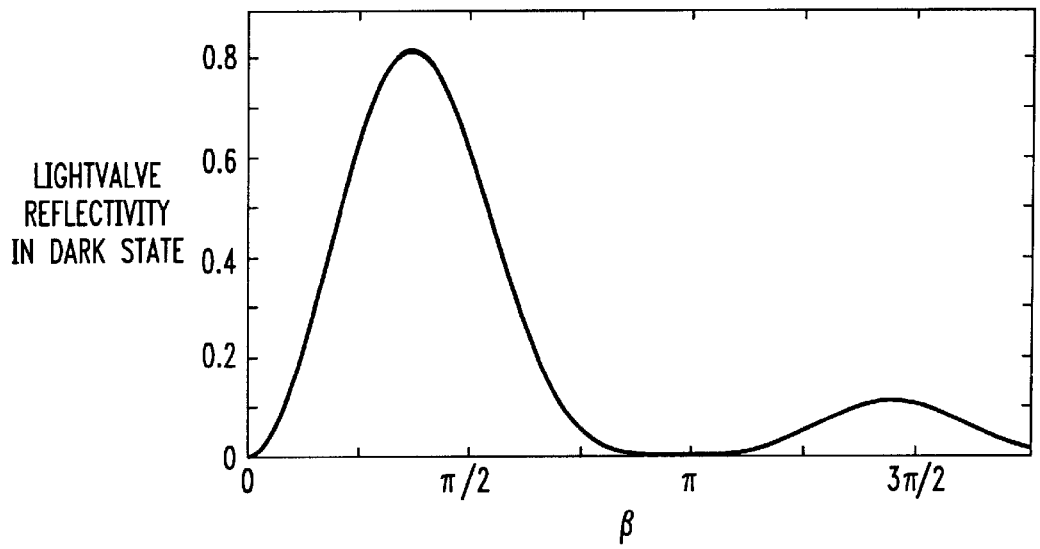
FIGS. 1A and 1B are linear scale and log scale graphs, respectively, illustrating a reflectivity response associated with a conventional lightvalve.
Figure 1B:
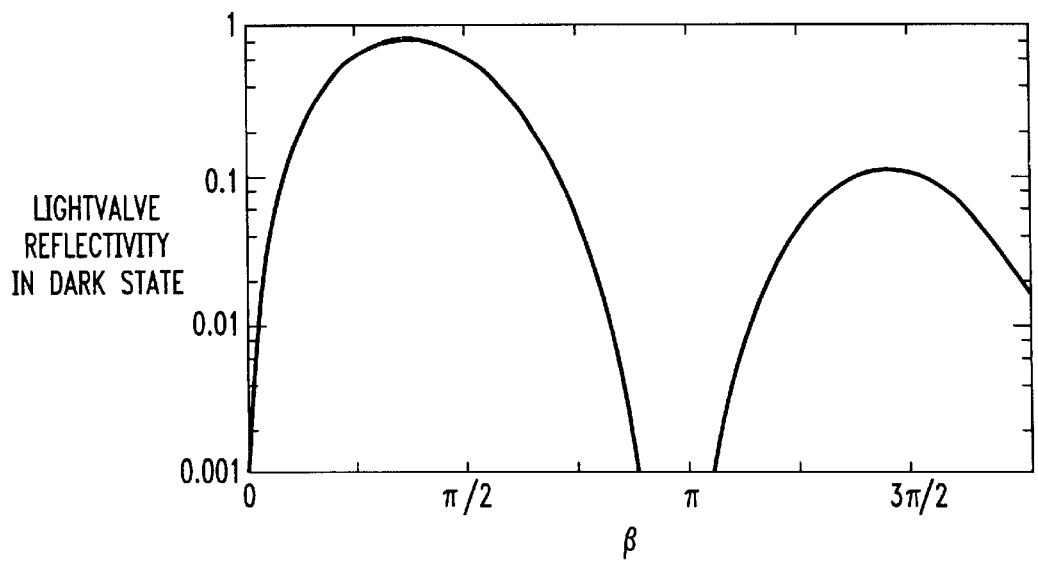

To make a reflective lightvalve that evades the performance limitations described above in the background section, it is advantageous to build on the performance of the prior art TNLC technology. Accordingly, we seek to improve the prior art system by incorporating a TNLC layer as the driven element in a new structure. The standard TNLC reflective lightvalve performs well at wavelengths close to the central wavelength satisfying equation (1). Most of the performance limitations described above are second order in a parameter that represents a departure from the equation (1) condition. This is because, in a reflective system, those first order effects which involve pure rotation of polarization will cancel out in the return pass through the layer. In the limitations described above in the background section, only the birefringence effect (subsection (6)) and the variation in backplane polarization orientation (subsection (7)b.) are first order effects.

If $\delta(d\Delta N)$ and $\delta\lambda$ represent departures from the nominal parameters $(d\Delta N)_{00}$ and $\lambda_{00}$ (i.e., at wavelength $\lambda_{00}$, the cell retardation is $(d\Delta N)_{00}$, with $(d\Delta N)_{00}$ and $\lambda_{00}$ satisfying equation (1)), the first order Jones matrix for the TNLC layer is given by:

$$M_{SingleLC} \cong -R(a)\left\{I + \left(\frac{\beta_{00}}{\pi}\right)^2 \left[\frac{\delta(d\Delta n)}{(d\Delta n)_{00}} - \frac{\delta\lambda}{\lambda_{00}}\right]\begin{pmatrix} i\beta_{00} & a \\ -a & -i\beta_{00} \end{pmatrix}\right\}, \quad (6)$$

where $R(\alpha)$ is the matrix for rotation by a constant angle $\alpha$, I is the identity matrix, and $\beta_{00}$ is $\pi(d\Delta N)_{00}/\lambda_{00}$. Equation (6) represents only a single pass through the LC. The reflective backplane then multiplies equation (6) on the left, followed leftward by the matrix for the return path through the LC.

Matrix R needs to be canceled in order to achieve the desired parallelism (described above in subsection (7)a. and c. of the background section) between the backplane polarization and the pixel edges. As will be seen, this can be achieved by rotating the equation (6) LC layer, to obtain:

$$M_{Single, New} \cong \quad (7)$$
$$R(-a)\left[-R(a)\left\{I + \left(\frac{\beta_{00}}{\pi}\right)^2 \left[\frac{\delta(d\Delta n)}{(d\Delta n)_{00}} - \frac{\delta\lambda}{\lambda_{00}}\right]\begin{pmatrix} i\beta_{00} & a \\ -a & -i\beta_{00} \end{pmatrix}\right\}\right]R(a).$$

Since the rotation applied to the layer is constant, it is also necessary to cancel the wavelength dependence in the rotational off diagonal elements of the perturbation matrix in order to obtain the desired λ independent orientation at the backplane (as described above in subsection (7)b. of the background section). The perturbation matrix is the term in equations (6) and (7) proportional to $((i\beta_{00}, \alpha), (-i\beta_{00}, -\alpha))$. The real off diagonal elements of the perturbation matrix (which are proportional to the twist angle $\alpha$) represent a wavelength dependent rotation.

Similarly, to permit complete correction of compound angle depolarization in the optics via a waveplate (as per subsection (6) described above in the background section), it is necessary to cancel the wavelength dependence of the birefringence-like diagonal elements of the perturbation matrix proportional to $i\beta_{00}$. The reflective LV is opaque on the left, so an added corrective structure must (after canceling the rightmost R by suitable rotation) introduce a right multiplication by the dispersion canceling factor represented as:

$$I - \left(\frac{\beta_{00}}{\pi}\right)^2 \left[\frac{\delta(d\Delta n)'}{(d\Delta n)_{00}} - \frac{\delta\lambda}{\lambda_{00}}\right]\begin{pmatrix} i\beta_{00} & a \\ -a & -i\beta_{00} \end{pmatrix} = \quad (8)$$
$$I + \left(\frac{\beta_{00}}{\pi}\right)^2 \left[\frac{\delta(d\Delta n)'}{(d\Delta n)_{00}} - \frac{\delta\lambda}{\lambda_{00}}\right]\begin{pmatrix} -i\beta_{00} & -a \\ a & i\beta_{00} \end{pmatrix}.$$

The wavelength dependent portion of an added structure per equation (8) will cancel the wavelength dependent portion of equation (7). To realize the benefits relating to subsections (6) and (7) described above in the background section, it is not necessary that the λ independent factor $\delta(d\Delta N)$ be canceled. This is indicated by the use of a different factor $\delta(d\Delta n)'$ in equation (8).

To achieve the necessary correction, it is thus desirable that the added element (equation (8)) have opposite off diagonal elements (twist) to the driven equation (7) layer, and that its diagonal elements (birefringence) have opposite sign, and that these elements have at least approximately equal magnitude, though from considerations to this point, they may differ by the small wavelength independent quantity $[\delta(d\Delta n)'-\delta(d\Delta n)]$.

Mathematically at least, the added structure must then have a form similar to equation (6), but with opposite signs. Let us seek solutions of the form $XM'_{Single}$, where $M'_{Single}$ takes the general form of equation (6), and where X is an additional element. In order that the system exhibit no depolarization at $\lambda_{00}$, we require that:

$$R(a)XR(a') = \begin{pmatrix} e^{i\varphi} & 0 \\ 0 & e^{-i\varphi} \end{pmatrix}, \quad (9)$$

i.e., at $\lambda_{00}$, the system must exhibit at most a constant retardance $2\phi$ that can be corrected by adjusting the retardance of an external waveplate used also to correct the PBS (polarizing beamsplitter) compound angle effect.

We further require that:

$$\frac{\partial}{\partial\lambda}\{(R(-a)[R(a)M_{Single,LC}]R(a))X[R(a')M'_{Single}]\} = 0, \quad (10)$$

i.e., the new structure should not exhibit the limitations described above in subsections (6) and (7) of the background section at wavelengths away from $\lambda_{00}$.

It can be shown that the only two solutions to equations (9) and (10) are:

(1) $\phi=0$; X is null, $\alpha'=-\alpha$, $\beta'_{00}=-\beta_{00}$, or (2) $\phi=\pi/2$; X is a halfwave plate, $a'=+a$, $\beta'_{00}=-\beta_{00}$.

The common $\beta'_{00}=-\beta_{00}$ condition in solutions (1) and (2) can be satisfied by building the M' structure as a TNLC layer whose LC molecules at the entrance face are oriented at 90° to those at the entrance face of the driven layer (prior to the equation (7) rotation of the driven layer). This reverses the sign of dΔn. Without loss of generality, we can consider dΔn to be positive in the driven layer.

The first solution above is generally preferred because an added element X is not required. However, solution (2) has some interest because, with certain compromises, it can be implemented on a driven TNLC lightvalve that is unmodified, i.e., on a driven TNLC lightvalve that was not designed to be operated in a two layer structure.

Thus far, only the limitations of the prior art TNLC lightvalves as described above in subsections (6) and (7) of the background section have been addressed. As noted, the remaining subsection items generally cannot be investigated using the first order analysis of equations (6) through (10). In order to devise a structure that addresses the remaining issues, we use the methods in A. E. Rosenbluth et al., "Contrast Properties of Reflective Liquid Crystal Lightvalves in Projection Displays," IBM Journal of Research and Development 42, 3/4, pp. 359–386 (1998), the disclosure of which is incorporated by reference herein, to calculate the crossed-polarizer reflectivity of a double LC system based on solution (1) above. $\pi d\Delta n/\lambda$ for the driven layer is denoted $\beta$, for the undriven layer $\beta'$. $\beta$ and $\beta'$ may differ either because of a difference in the initial values of d and/or Δn, or because of a change in Δn for the driven layer arising from a change in drive voltage. As an approximation, the applied voltage is assumed to cause a uniform tilt in the LC molecules throughout the depth of the LC layer. We find that the crossed-polarizer reflectivity is given by:

$$B = \frac{a^2}{\gamma^2 \gamma'^2}\left[2\frac{\beta-\beta'}{\gamma\gamma'}(\beta\beta'\sin^2\gamma + a^2\sin^2\gamma') + \beta\left(\left[1 - \frac{a^2+\beta\beta'}{\gamma\gamma'}\right]\sin^2[\gamma+\gamma'] - \left[1 + \frac{a^2+\beta\beta'}{\gamma\gamma'}\right]\sin^2[\gamma-\gamma']\right)\right]^2 + \frac{NA^2}{n^2}\left[a^2\frac{\beta-\beta'}{\gamma\gamma'}\sin 2\gamma + \frac{\beta}{\gamma}\left(\left[1 + \frac{a^2+\beta\beta'}{\gamma\gamma'}\right]\sin 2(\gamma-\gamma') - \left[1 - \frac{a^2+\beta\beta'}{\gamma\gamma'}\right]\sin 2(\gamma+\gamma')\right)\right]^2 \quad (11)$$

First, we note that when $\beta=\beta'$, we also have $\gamma=\gamma'$ and $\gamma\gamma'=\alpha^2+\beta\beta'$. It then follows from equation (11) that when (dΔn)=(dΔn)', the crossed polarizer response of the lightvalve structure is 0, independent of NA (or $\lambda$). This addresses the compound angle depolarization (subsection (6) above in the background section) which, except at band center, produces a nonzero black state in the prior art TNLC lightvalve at finite NA.

To address subsection (8) above in the background section, i.e., distorted spectral response at intermediate gray levels of the prior art TNLC lightvalve, we first consider the case in which the applied voltage produces only a small difference in the dΔn values for the two layers. Expanding equation (11), and treating $NA^2$ as a small quantity, we find:

$$I \cong I_{Single}\left[\frac{(d\Delta n) - (d\Delta n)'}{\langle d\Delta n\rangle}\right]^2, \quad (12)$$

where <dΔn> is the mean value for the layers, and $I_{Single}$ is the reflectivity of a single driven LC alone (first term of equation (5)) when its dΔn value is set to <dΔn>. Equation (12) suggests that if the mean dΔn value were set to a value sufficiently small that, at low voltages, $I_{Single}$ achieved the extremal maximum normally associated with high voltage operation (i.e., at low voltage, $I_{Single}$ is already effectively in the white state of the single layer LC), then because of the relatively flat spectral response of the single layer in bright state, the equation (12) response of the new system, under modest voltage, would also be relatively achromatic. This is a qualitatively useful insight, but at many wavelengths of interest, $I_{Single}$ will be small, and equation (12) is not applicable in these cases (because for small $I_{Single}$, the higher order terms neglected in equation (12) can be numerically larger than the retained term).

To achromatize the response, we instead expand equation (11) in small changes of Δn and $\lambda$ about the values $\Delta n_{00}$ and $\lambda_{00}$ at which equation (1) is satisfied. $\delta(\Delta n)$ then represents a small change in the birefringence of the driven layer due to an applied voltage, and $\delta\lambda$ represents the difference between a projected wavelength $\lambda$ and the wavelength $\lambda_{00}$ at which equation (1) is satisfied. We obtain:

$$I \cong \left(\frac{2a\beta_{00}^5}{\pi^4}\right)^2\left(\frac{\delta(\Delta n)}{\Delta n_{00}}\right)^2\left[\left(\frac{\delta\lambda}{\lambda_{00}} + \frac{1}{2}\frac{\delta(\Delta n)}{\Delta n_{00}}\right)^2 - \left(\frac{\delta(\Delta n)}{\Delta n_{00}}\right)\left(1 + \frac{1}{4}\frac{\delta(\Delta n)}{\Delta n_{00}}\right)\right]^2. \quad (13)$$

This may be compared to the result for the prior art reflective TNLC, obtained by expanding the first term in equation (5). This analogue of equation (13) for the conventional lightvalve is:

$$I_{Single} \cong \left(\frac{2a\beta_{00}^3}{\pi^2}\right)^2\left[\frac{\delta(\Delta n)}{\Delta n_{00}} - \frac{\delta\lambda}{\lambda_{00}}\right]^4. \quad (14)$$

Figure 2:
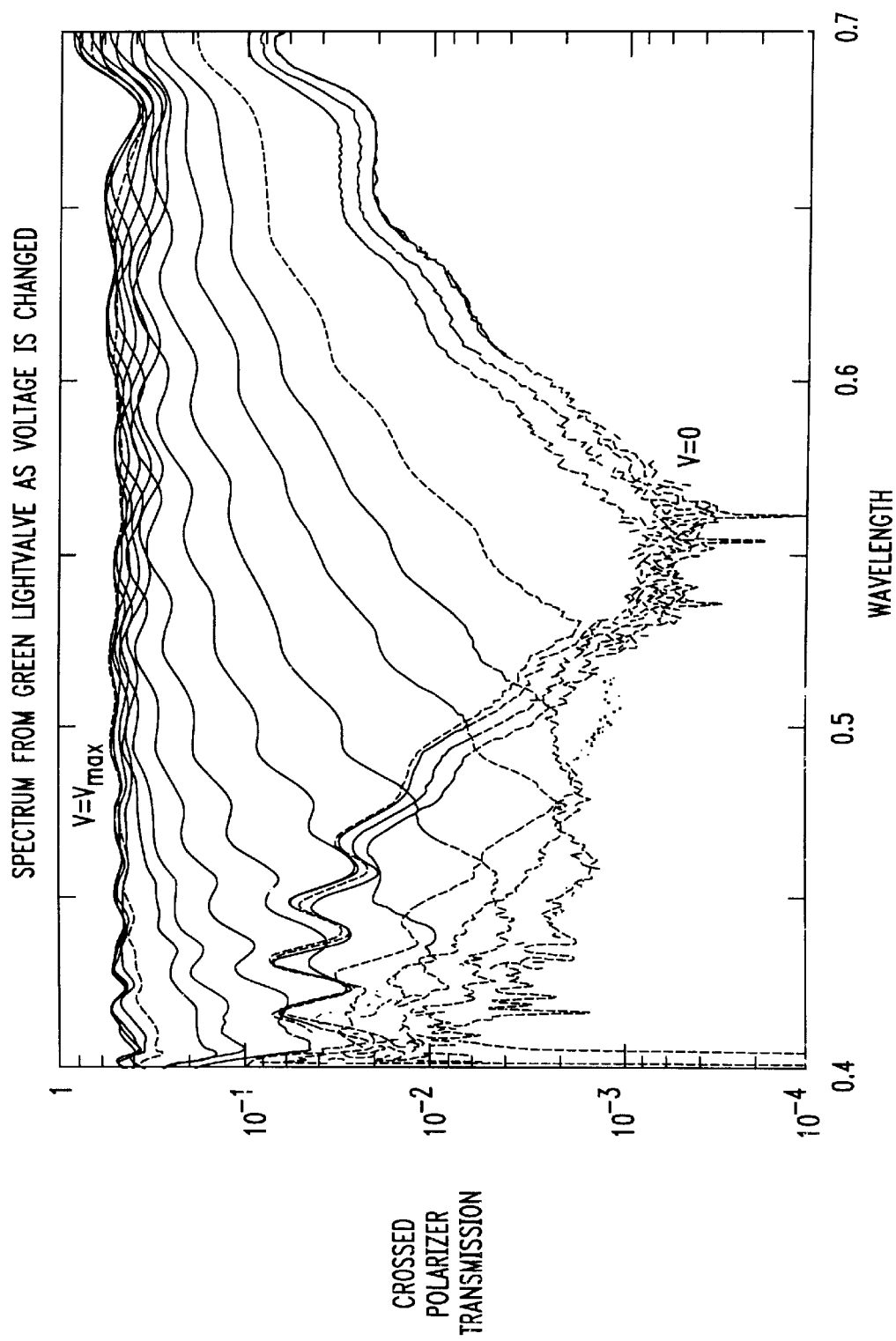
FIG. 2 is a graph illustrating a response associated with voltage changes in a conventional lightvalve.

Equation (14) implies that as $\delta(\Delta n)$ becomes increasingly negative under a voltage applied to the conventional lightvalve, the wavelength of minimum reflectivity shifts shorter ($\delta\lambda<0$), away from its initial position at $\delta\lambda=0$ in the center of the color band. As the minimum shifts towards the short end of the color band, the equation (14) intensity increases as $\delta\lambda^4$ towards longer wavelengths, giving rise to a decentered spectrum and hence the chromatic shift described above in subsection (8) of the background section (illustrated in FIG. 2).

The equation (13) result for the new structure also exhibits an essentially 4th order dependence. However, consider now some central wavelength in the color band which we denote $\langle\lambda\rangle$, with $\langle\lambda\rangle\equiv\lambda_{00}+\langle\delta\lambda\rangle$. Thus, in the new structure, we no longer assign the center of the color band $\langle\lambda\rangle$ to the wavelength $\lambda_{00}$ which satisfies equation (1). If we set the LC thickness (i.e., adjust $\langle\delta\lambda\rangle$, implicitly adjusting $\lambda_{00}\equiv\langle\lambda\rangle-\langle\delta\lambda\rangle$) to a value which at $\langle\lambda\rangle$ cancels the parabolic factor within the equation (13) square bracket at some "typical" midrange gray level, then equation (13) indicates that the spectral variation in reflectivity of the new structure should be almost eliminated. In other words, if we select some typical midgray level which involves a change in birefringence denoted $\langle\delta(\Delta n)\rangle$ (i.e., at this typical gray level such as I=25% the birefringence Δn of the driven cell is given by $\Delta n = \Delta n_{00} + \langle\delta(\Delta n)\rangle$), and if we adjust $\lambda_{00}$ (i.e., the cell gap) in such a way that at this typical gray level we cancel the square bracket parabolic term by satisfying the condition:

$$\frac{\langle\delta\lambda\rangle}{\lambda_{00}} \sim -\frac{1}{2}\frac{\langle\delta(\Delta n)\rangle}{\Delta n_{00}} \quad (15)$$

then we would expect from equation (13) to achieve an almost achromatic gray level response, because the parabolic term will remain small even at wavelengths away from $<\lambda>$ and gray levels away from $<\delta(\Delta n)>$. Since $\delta(\Delta n)$ is negative under an applied voltage, equation (15) implies that to achieve near achromaticity we should set $\lambda_{00}\equiv<\lambda>-<\delta\lambda>$ to a shorter wavelength than those typical of the color band being projected. We therefore design the new structure in such a way that the thicknesses of the LC layers are blue-shifted, that is, they satisfy equation (1) at a shorter wavelength than the wavelengths being projected, making $<\delta\lambda>$ positive.

Figure 5A:
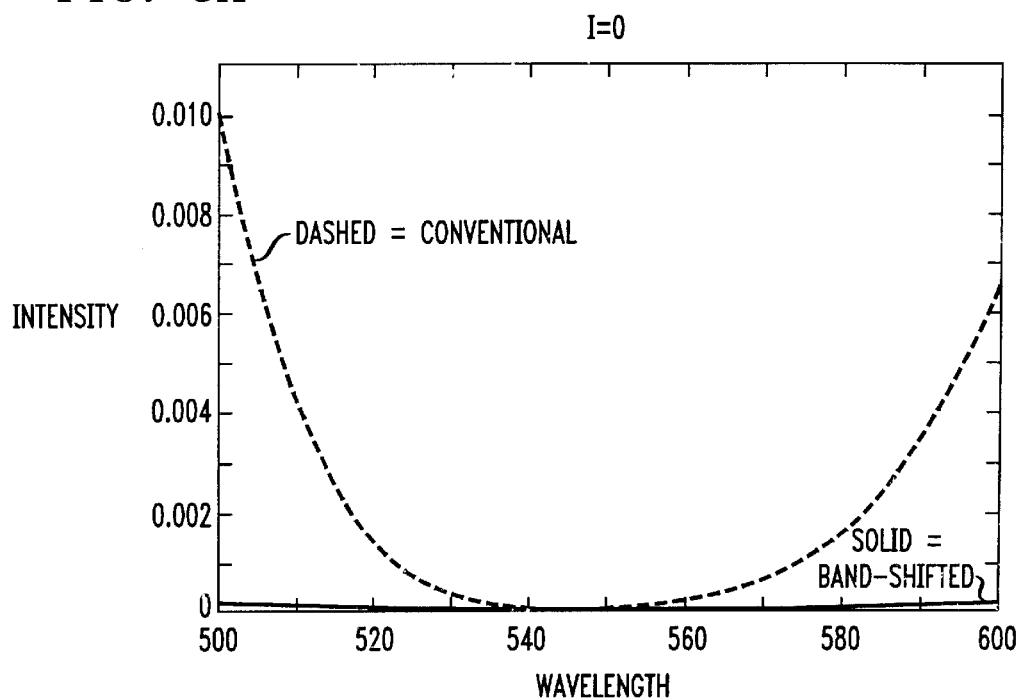
FIGS. 5A through 5H are graphs illustrating a green channel spectral response of a conventional green centered TNLC lightvalve at various intensity values.
Figure 5B:
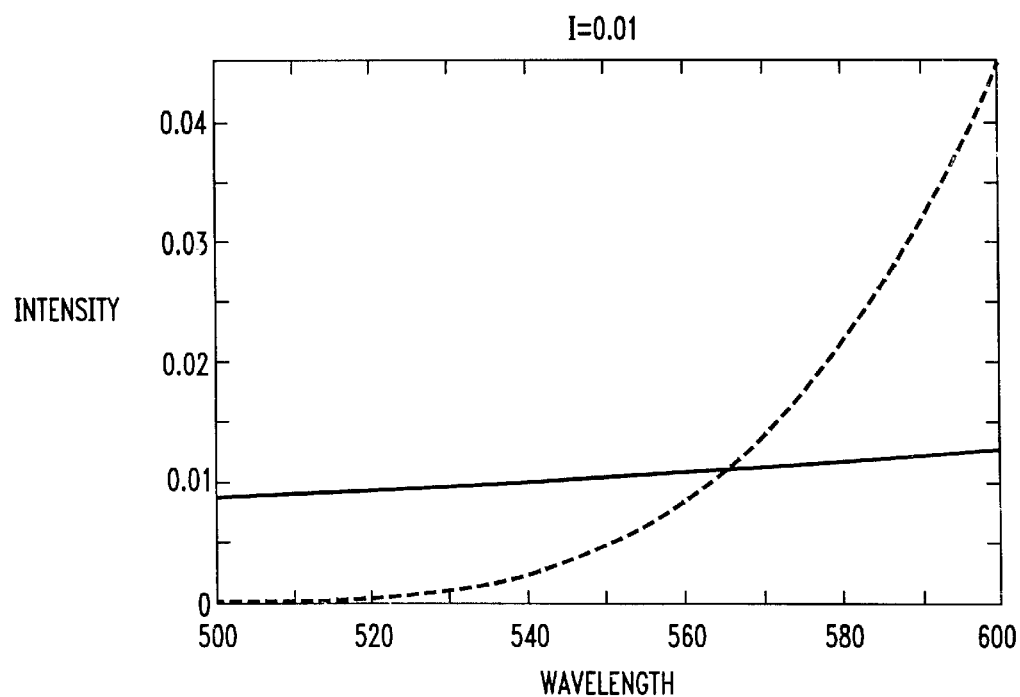
Figure 5C:
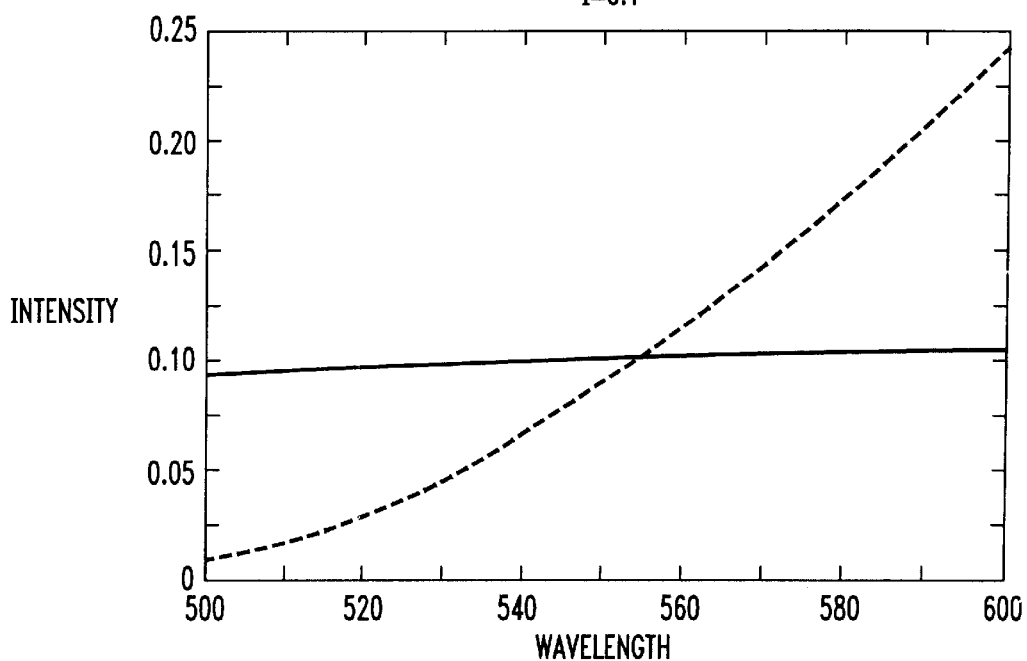
Figure 5D:
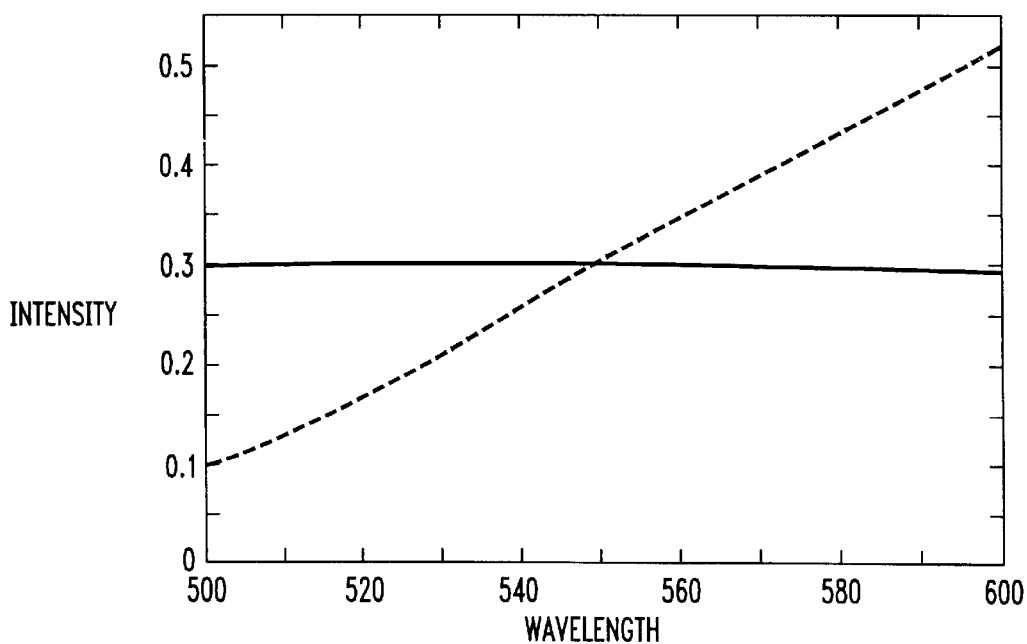
Figure 5E:
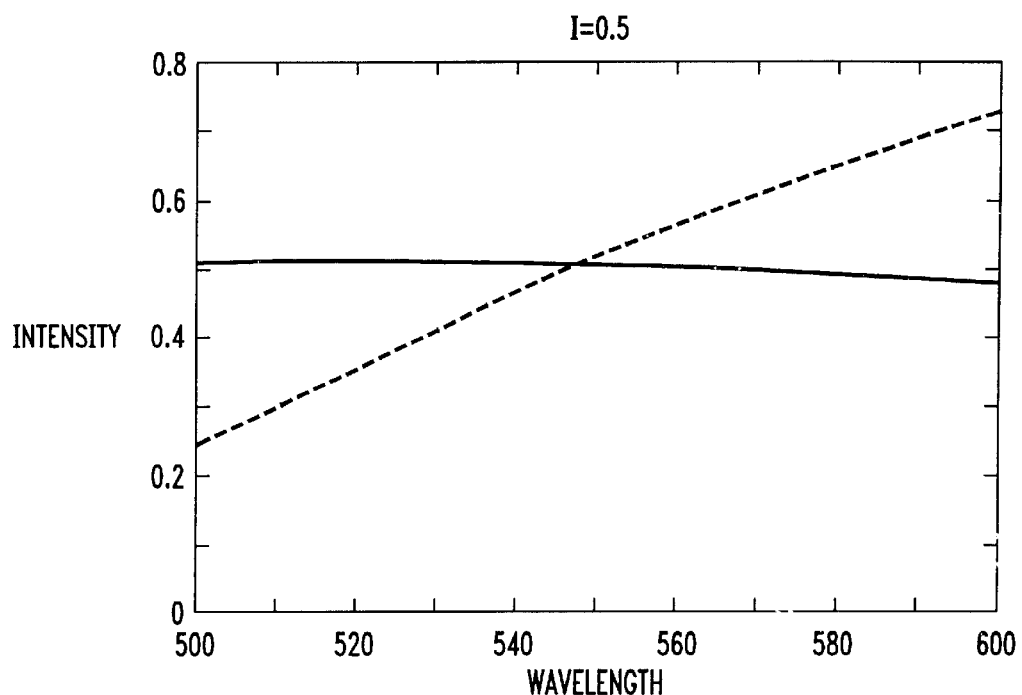
Figure 5F:
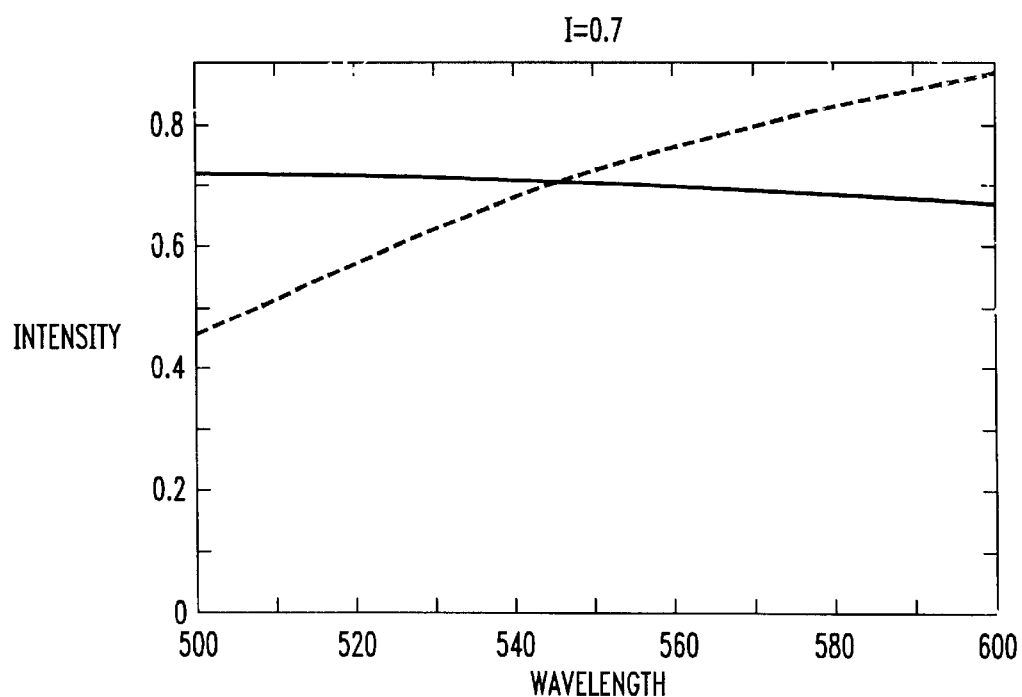
Figure 5G:
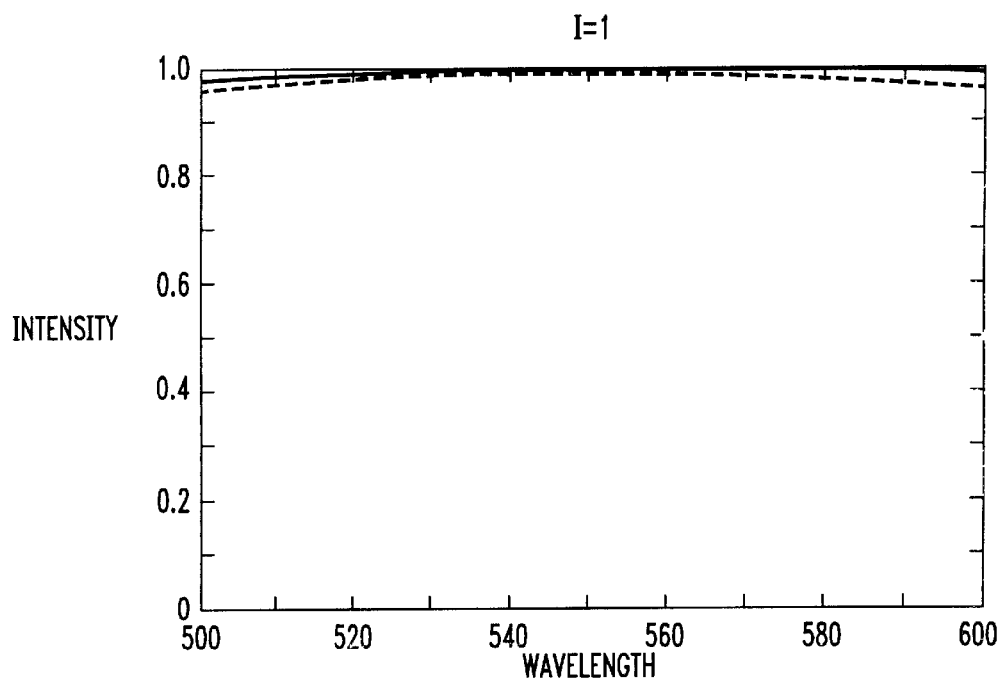
Figure 5H:
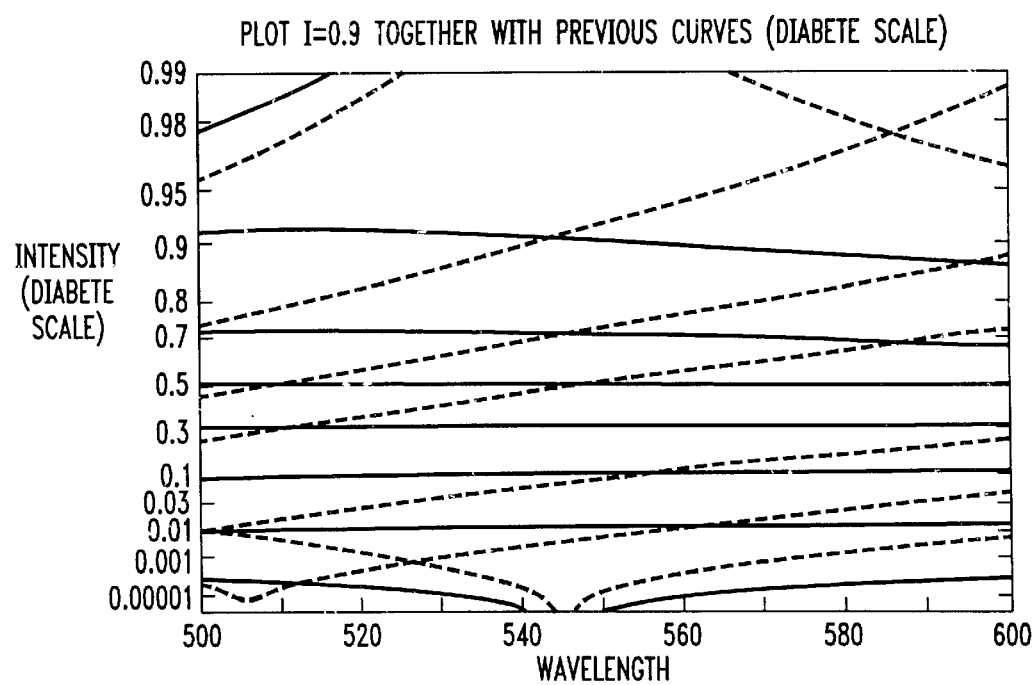

Though equations (13) through (15) are only approximate (for example, material dispersion is neglected), the alternative expansion in equation (12) has also indicated the benefit of a blue-shifted structure. Moreover, equation (11) or numerical LC models are available for more exact calculations. FIGS. 5A through 5H show the green channel spectral response (dashed lines) of a conventional green centered TNLC lightvalve ($\lambda_{00}$=545 nanometers (nm), d=2.6 micrometers ($\mu$m), $\alpha$=54°), compared with the response (solid line) of the new band-shifted structure (blue-shifted to $\lambda_{00}$=472 nm, d=2.1 $\mu$m) of the present invention, for various intensity I values. FIG. 5H shows the curves from FIGS. 5A through 5G, in addition to the curves for I=0.9. Each is calculated under the equation (11) approximation that drive voltage tilts the LC molecules in a uniform way across the depth of the driven LC layer. The spectral response of the new structure (solid lines) is almost flat across the green channel.

Figure 4B:
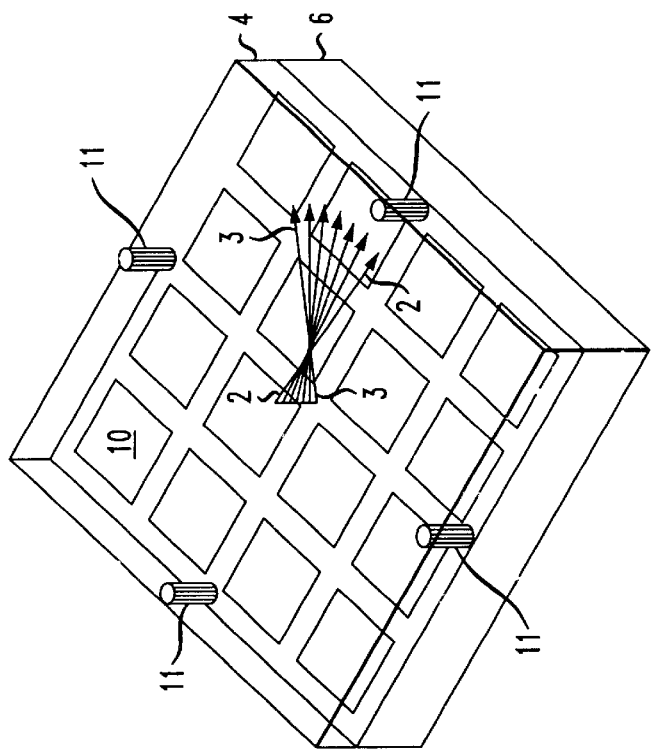
FIGS. 4A and 4B are diagrams illustrating a conventional lightvalve.
Figure 6A:
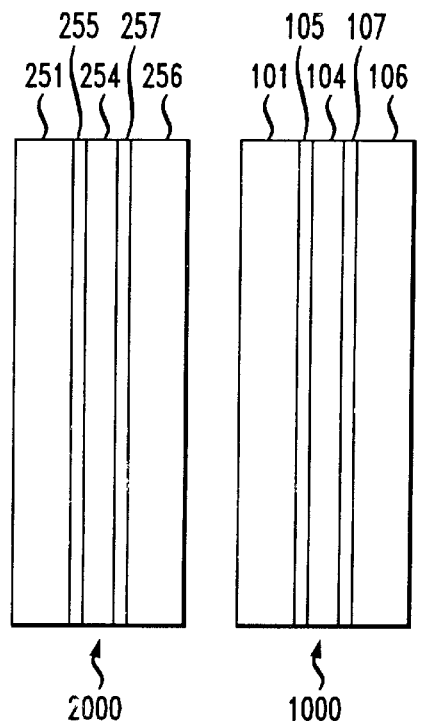
FIG. 6A is a diagram illustrating an LC structure according to a first embodiment of the present invention.

Referring now to FIG. 6A, a preferred embodiment is shown of a band-shifted LC structure according to the present invention. The new structure comprises a pixelated cell 1000 and an upper cell 2000. The pixelated cell 1000 comprises an LC medium 104 between a substrate 106 and a topglass 101. The topglass 101 and the LC medium 104 are coupled by an alignment layer 105, while the LC medium 104 and the substrate 106 are coupled by an alignment layer 107. Upper cell 2000 comprises an LC medium 254 between transparent substrates 251 and 256. The transparent substrate 251 and the LC medium 254 are coupled by an alignment layer 255, while the LC medium 254 and the transparent substrate 256 are coupled by an alignment layer 257. The cells 1000 and 2000, which comprise the inventive LC lightvalve structure, may be mounted independently in a light engine system in accordance with conventional mounting techniques (not shown). In such an arrangement, substrate 106 may serve as a pixelated reflective backplane (similar to pixelated substrate 6 in FIG. 4B) with the LC medium 254 of the upper cell 2000 positioned proximate the LC medium 104, as shown in FIG. 6A. It is to be appreciated that, while cell 2000 is referred to as an "upper" cell, it is the position of the cells with respect to each other that is of importance, rather than the spatial orientation of the light engine system in which these cells are mounted. That is, what is important is that LC medium 104 is positioned between the substrate 106 and the LC medium 254. Whether the orientation of the light engine system causes the LC medium 254 to be on the top of (on the bottom of, to the left of, to the right of, or some other orientation) LC medium 104 does not matter to the operation of the LC structure of the invention. Of course, the overall positioning of the LC structure and the entire light engine system is done consistent with the direction of the light signals incident on the LC structure.

Figure 7:
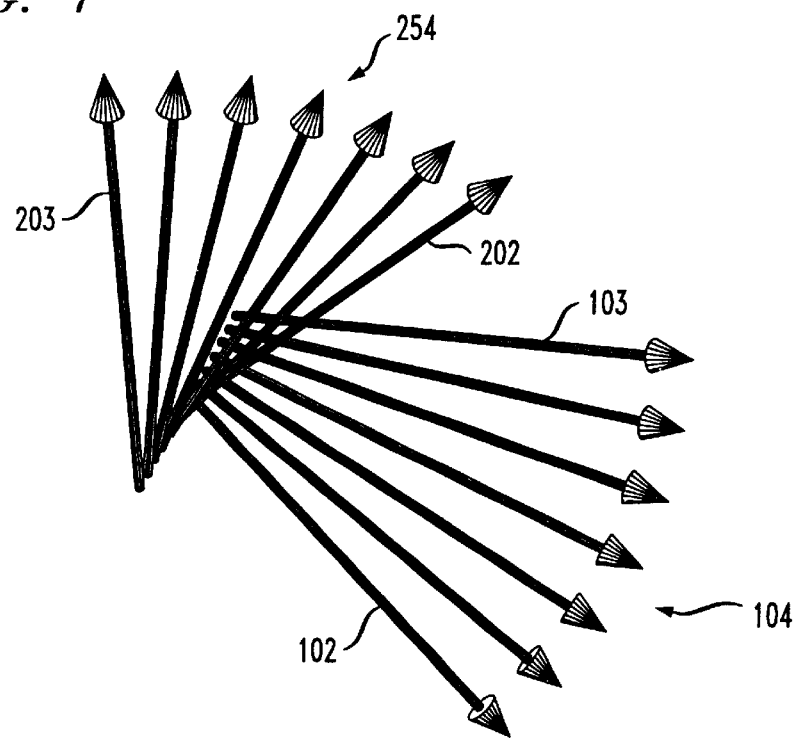
FIG. 7 is a diagram schematically illustrating LC molecules inside layers of the LC structure of FIG. 6A.

FIG. 7. schematically illustrates the LC molecules inside layers 104 and 254 of the embodiment shown in FIG. 6A. The planes within layers 104 and 254 that are closest to one another are of opposite birefringence. This may be achieved by orienting the LC molecules in the two planes perpendicular to one another, as shown schematically by arrows 102 and 202. Proceeding away from these closest planes into interior planes of layers 104 and 254, the LC molecules in each layer undergo opposite twists. The opposite birefringences of molecules 102 and 202 cancel one another. The molecules of the next closest pair of planes are also opposite to one another, and the cancellation of the birefringence in the intervening planes (102 and 202) means that the birefringences in this next closest pair of planes cancel as well. The LC molecules 103 that are closest to the pixelated backplane have an orientation that is rectilinear with the backplane pixel edges, while the LC molecules 203 at the outside of the structure have an orientation that is approximately rectilinear with the incident polarization. It should be noted that the director axes of the LC molecules are not precisely perpendicular to the lightvalve normal. They are instead tilted away from true perpendicularity by a small pre-tilt angle, typically amounting to about 2 degrees.

Thus, with reference again to FIG. 6A, LC medium 104 is an LC layer that is tuned in the off state to switch incident light at the center of the specified band of wavelengths into a state that is not fully off, while LC medium 254 is an LC layer having a birefringence which, at a given depth within its thickness, is substantially equal and opposite to a birefringence of a layer within LC medium 104 that is located at a matching distance from a midplane separating the two LC mediums.

Figure 6B:
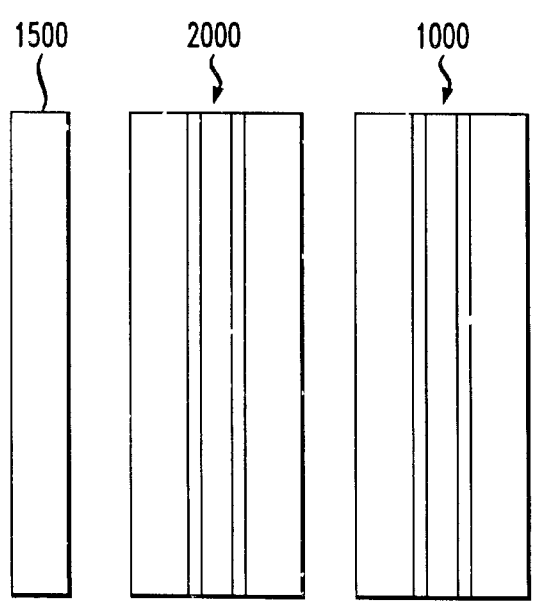
FIG. 6B is a diagram illustrating an LC structure similar to FIG. 6A but with a quarterwave plate layer.

FIG. 6B shows a tri-layer embodiment which includes a quarterwave plate (QWP) 1500 as an outer layer. The birefringent axes of the QWP are approximately aligned with the horizontal and vertical axes of the projected image.

Figure 8:
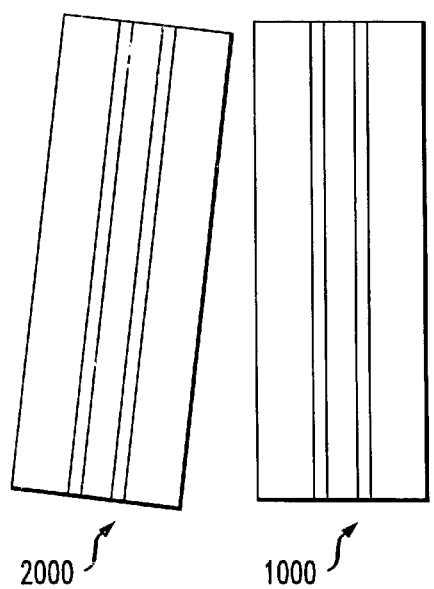
FIG. 8 is a diagram illustrating an LC structure according to a second embodiment of the present invention.

Referring now to FIG. 8, a modification to the embodiment of FIG. 6A is shown in which upper cell 2000 is tilted in order to deviate stray reflections outside of the system. When the LC structures of the present invention are only modestly band-shifted, the LC layers if used in isolation would only be modestly depolarizing. The layers are singly traversed by the weak beams which reflect even from anti-reflection-coated substrate surfaces, but the net depolarization resulting from both effects is very small. However, the depolarization from a singly traversed layer increases as blue-shifting is increased, and in an extreme case it may be desirable to tilt substrate 2000 in order to safely deviate stray reflections out of the lens pupil.

Figure 9:
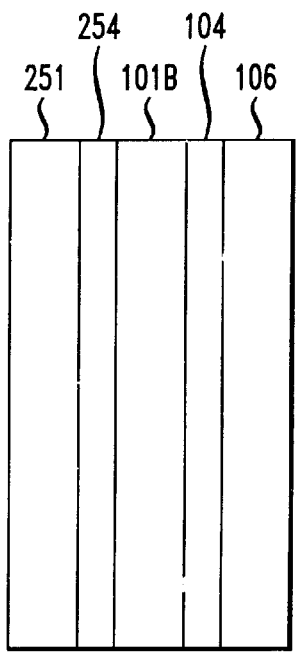
FIG. 9 is a diagram illustrating an LC structure according to a third embodiment of the present invention.

Referring now to FIG. 9, an embodiment is shown of a band-shifted LC structure according to the present invention in which stray reflections are eliminated by replacing substrates 101 and 256, as in the embodiment of FIG. 6A, with a single substrate 101B. Substrate 101B may be formed by cementing two substrates together, which allows LC layer 254 to be rotationally tuned. Alignment layers are not shown here for clarity.

Figure 10:
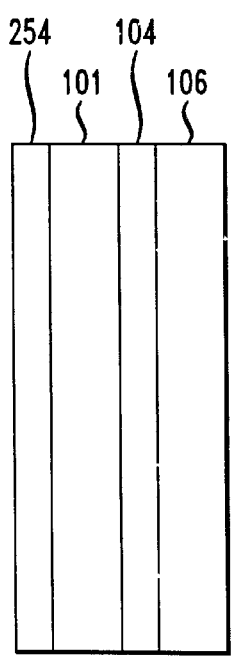
FIG. 10 is a diagram illustrating an LC structure according to a fourth embodiment of the present invention.

Referring now to FIG. 10, an embodiment is shown of a band-shifted LC structure according to the present invention in which LC layer 254 is of the polymerized kind which can be freestanding and no outer topglass is needed. Alignment layers are not shown here for clarity.

Figure 4A:
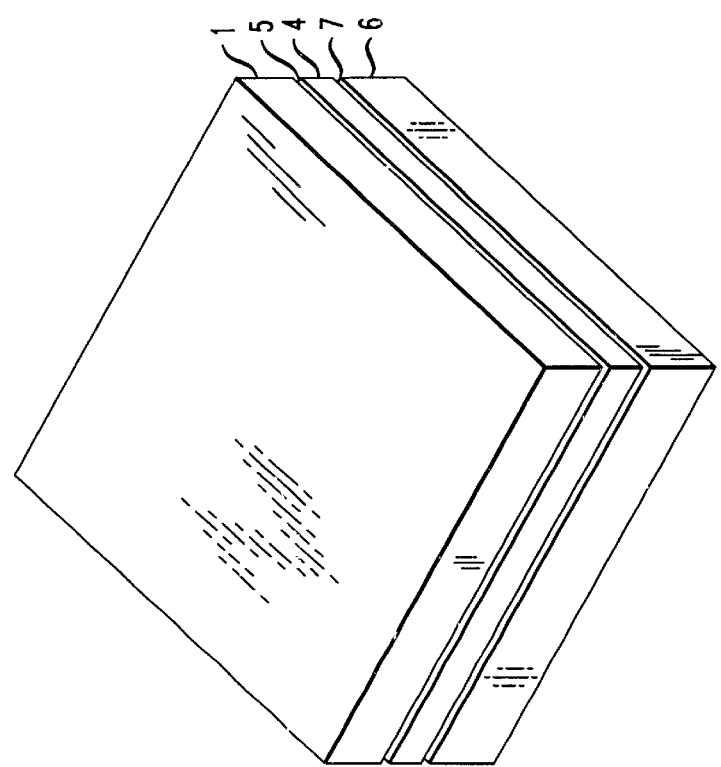
Figure 11:
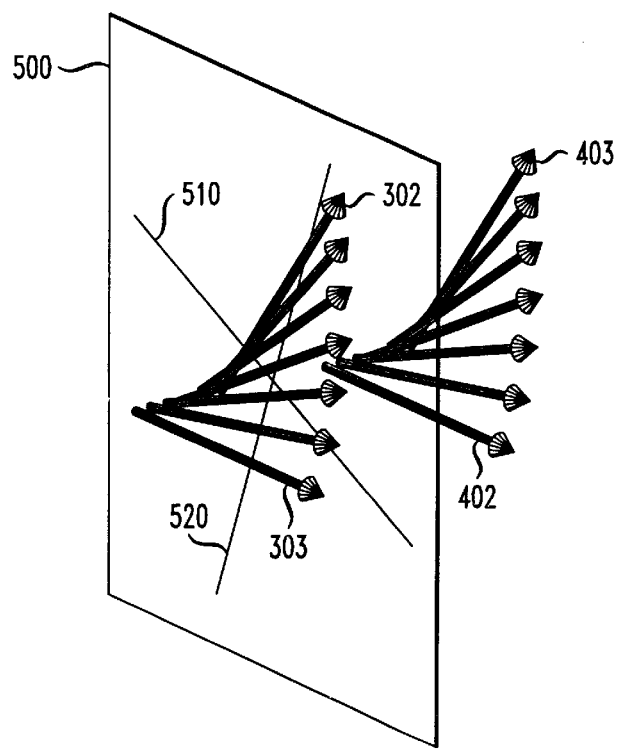
FIG. 11 is a diagram illustrating an LC structure according to a fifth embodiment of the present invention.

Referring now to FIG. 11, an embodiment is shown of a band-shifted LC structure according to the present invention in which the twist angles in the driven and undriven layers are the same, and where a halfwave layer 500 is inserted between them, i.e., between the two LC mediums in the structure. This embodiment does not provide all the advantages of the embodiment of FIG. 6A, but in the embodiment of FIG. 11, the rubbing directions 402 and 403 of the driven layer are in the same directions as in the prior art light valve in FIGS. 4A and 4B. This means that the corrective elements of the embodiment of FIG. 11 can be applied to a light valve of the conventional kind.

It is to be appreciated that the blue-shifting of the new LC structure of the invention is a key feature distinguishing it from the prior art double layer TNLC structures such as, for example, described in U.S. Pat. No. 4,408,839 issued to E. Wiener-Avnear and entitled "Twisted Nematic Liquid Crystal Light Valve with Birefingence Compensation," (1983); U.S. Patent No. 4,952,029 issued to M. Hayashi, N. Kimura, and Y. Ichimura and entitled "Two Celled Liquid Crystal Display Device with Dependency of Birefringence on Wavelength Larger in First Cell," (1990); and U.S. Pat. No. 5,155,608 issued to A. Hatano and entitled "Double-Layered Type TN-LCD Cell," (1992); and U.S. Pat. No. 4,436,379 issued to F. Funada et al. and entitled "Two-Layer Liquid Crystal Display Panel," (1984), the disclosures of which are incorporated by reference herein. Blue-shifting allows the new structure to address many limitations in the conventional lightvalves. One such limitation is the non-uniform spectral response plotted as the dashed curves in FIGS. 5A through 5H.

Figure 12A:
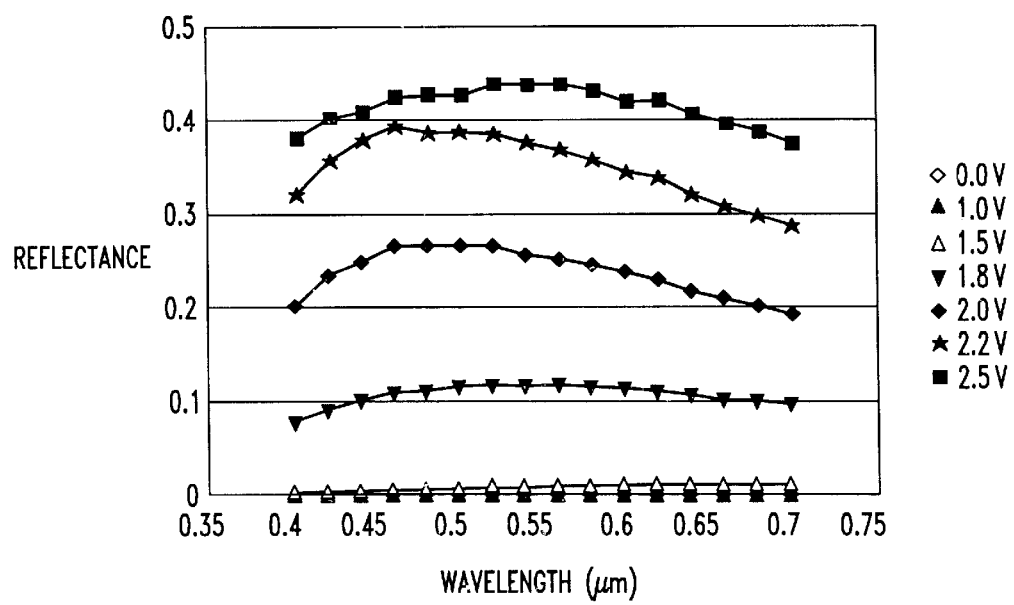
FIGS. 12A and 12B are graphs illustrating reflectance versus wavelength responses associated with a lightvalve according to an embodiment of the present invention.
Figure 12B:
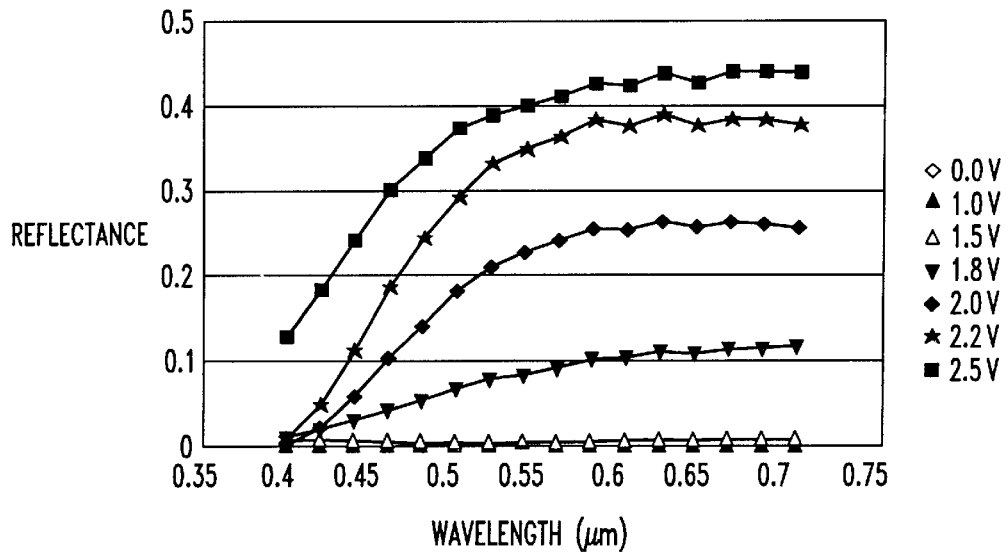
Figure 13:
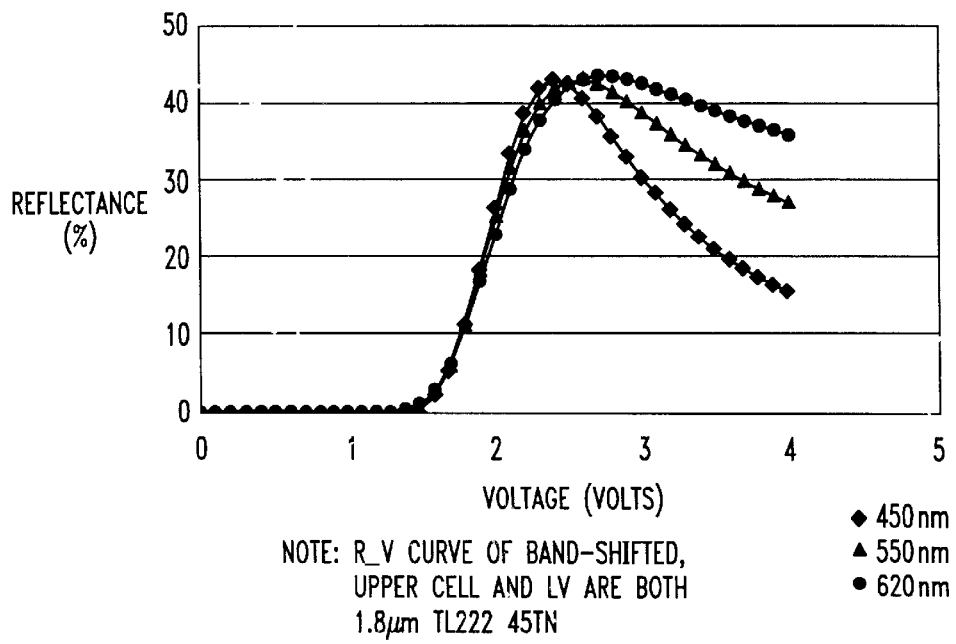
FIG. 13 is a graph illustrating reflectance versus voltage responses associated with a lightvalve according to an embodiment of the present invention.

Other limitations can also be addressed by the new structure. For example, a double structure that is band-shifted as short as violet wavelengths (e.g., to d=1.8 $\mu$m) provides a reasonably achromatic response across the entire visible spectrum. Wavelengths may typically be in the range of 380 to 430 nanometers. This is illustrated in FIG. 12A. Unlike the curves of FIGS. 5A through 5H, the curves of FIG. 12A take into account (at NA=0) the detailed response of the LC throughout its thickness. The calculation associated with FIG. 12A also takes into account absorptive losses in the backplane and other components. FIG. 13 shows a calculation of the reflectivity in the red, green, and blue color channels as a function of applied voltage. The new structure provides a suitable response in all three colors, addressing the limitations described above in subsections (1) and (3) of the background section. Without blue-shifting, the double cell does not provide a sufficiently achromatized response to cover the entire visible spectrum, as shown in FIG. 12B.

Figure 14:
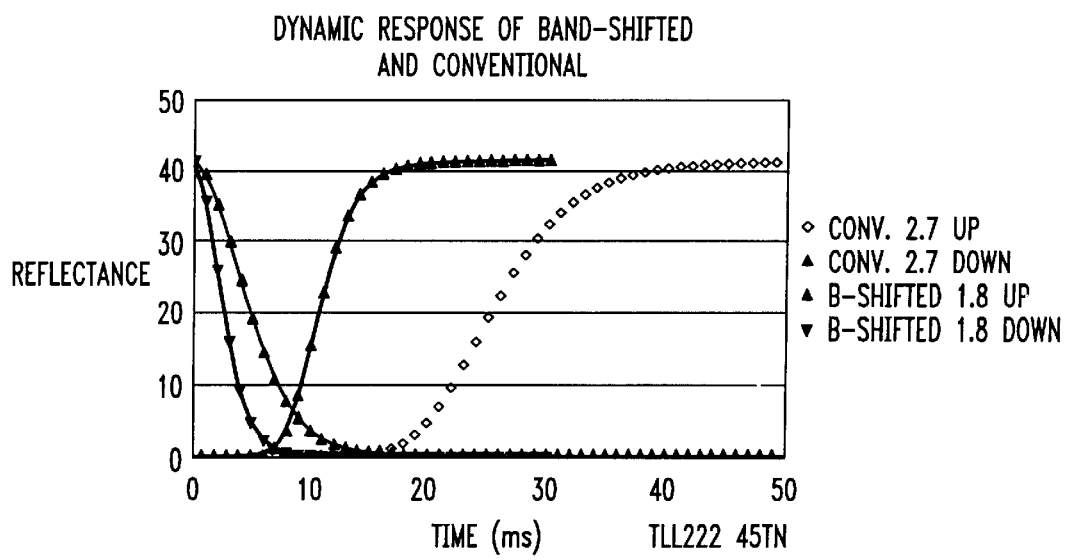
FIG. 14 is a graph illustrating reflectance versus time responses associated with a lightvalve according to an embodiment of the present invention.

Moreover, since the speed of the LC response scales as the inverse square of LC thickness d, the new violet centered LC is considerably faster than the conventional single or double cell TNLC lightvalves, thus addressing the limitation described above in subsection (2) of the background section. This is illustrated in FIG. 14.

Another way to exploit the small d$\Delta$n value of the new structure is to decrease $\Delta$n rather than d. At the acceptable d values used in today's lightvalves, it is then no longer necessary with the new lightvalves of the present invention to use LC materials having maximal $\Delta$n. As noted above in subsection (4) of the background section, there are advantages in using a broader range of LC materials.

Any layer operated in reflective mode (describable by a Jones matrix), if free from scatter or absorption (or which has an absorption that is independent of polarization), can in principle be tuned by rotation to have zero reflectivity between crossed polarizers at a single monochromatic wavelength. As noted above in subsection (5) of the background section, sufficiently small errors in the cell gap in the conventional lightvalue can theoretically be corrected by such a rotation without appreciably degrading other aspects of the LC response. As with the conventional lightvalve, simple rotational tuning of the new structure is ruled out by the impracticality of rotating the pixelated structure of the driven lightvalve.

Figure 15A:
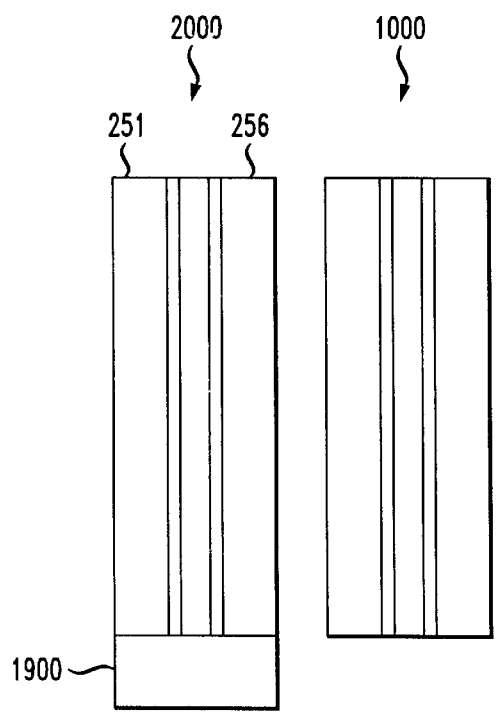
FIG. 15A is a diagram illustrating an LC structure with a rotational mount according to an embodiment of the present invention.

However, the new structure of the invention permits a degree of correction through rotation of the upper unpixelated LC layer. Such an embodiment is illustrated in FIG. 15A. Specifically, FIG. 15A schematically represents the rotational mount for upper cell 2000 as element 1900. The required stability in orientation is quite low, e.g., typically about 0.2°, so the mount can be extremely simple, for example, a sleeve that is rotated by a threaded adjustment knob. An even simpler approach is to fabricate the 251 and 256 substrates of cell 2000 as circular plates, so that the cell can be rotated by hand if held loosely in a frame. Once the optimum orientation is found, cell 2000 can be tacked or clamped in place. Rotation of the upper unpixelated LC layer improves the tolerance on LC thickness, which in most cases is superior to that of the conventional structure. In addition, a QWP layer, such as QWP 1500 in the embodiment of FIG. 6B, may also be rotated.

Figure 15B:
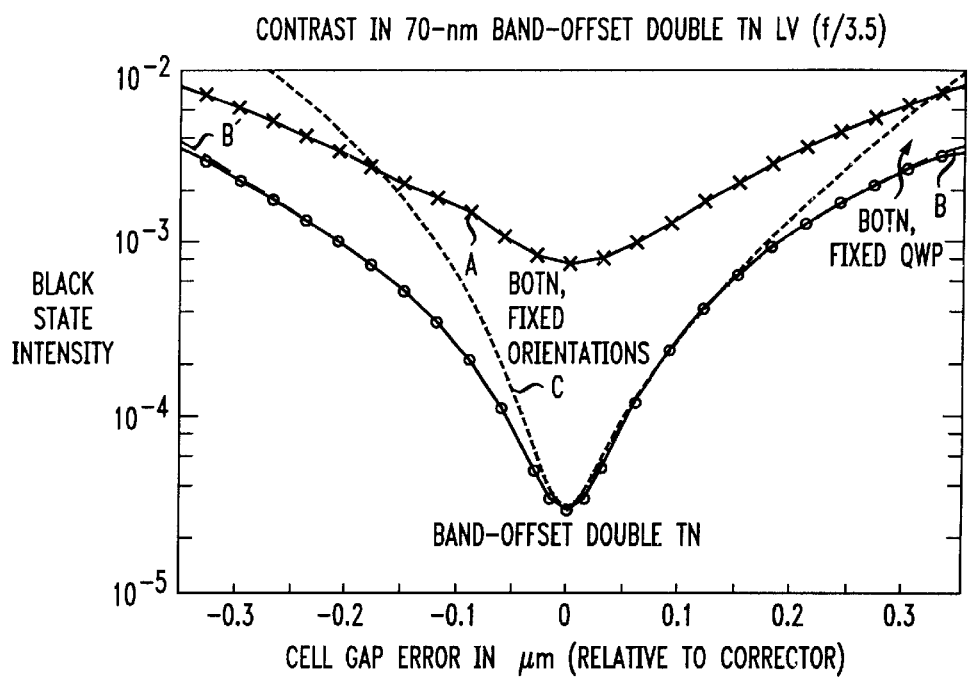
FIG. 15B is a graph illustrating black state intensity versus cell gap error responses associated with a lightvalve according to an embodiment of the present invention.

Results associated with layer rotation are illustrated in FIG. 15B. The curve marked with open circles plots black state intensity of the new structure as a function of cell gap error. The nominal cell gap is 2.1 $\mu$m. To a good approximation, only the difference between the two nominally equal cell gaps of the double structure is relevant. As we have seen, the structure is very insensitive to shifts of the two gaps in the same direction. FIG. 15B plots, as a curve marked with crosses, the intensity in black state of the conventional structure (nominal cell gap is 2.65 $\mu$m), under two different possible normal orientations of the quarter wave plate, QWP, (close to 0°, or close to 90°). For each cell gap error, the QWP is rotated slightly away from 0° or 90° to provide minimum intensity. The optimum QWP orientation is close to 0° for points to the left of the point labeled A, while for points to the right of A, the optimum is close to 90°.

In the circle-marked curve of FIG. 15B, the unpixelated LC layer and QWP are independently rotated for best black state. The almost superposed dashed curve shows the result of rotating only the LC layer, leaving the QWP fixed. The dashed curve is obscured by the circle-marked curve that overlies it, except near the spectral endpoints. The endpoint sections of the dashed curve are labeled B and B' to help distinguish the curve. FIG. 15B thus shows that, with the new structure, the QWP can be fixed without appreciably narrowing cell gap tolerances. FIG. 15B also plots, as a curve labeled C, the black state intensity obtained when neither component is rotated. This curve is relevant to the uniformity of cell gap control, since rotation must be applied to the entire LC layer at once. Uniformity tolerances can also be evaluated using a variant of equation (13):

$$I \cong \left(\frac{2\alpha\beta_{00}^5}{\pi^4}\right)^2 \left(\frac{\delta d}{d_{00}}\right)^2 \left[\left(\frac{\delta\lambda}{\lambda_{00}} + \frac{1}{2}\delta\frac{d}{d_{00}}\right)^2 - \left(\frac{\delta d}{d_{00}}\right)\left(1 + \frac{1}{4}\delta\frac{d}{d_{00}}\right)\right]^2 \approx \left(\frac{2\alpha\beta_{00}^5}{\pi^4}\right)^2 \left(\frac{\delta d}{d_{00}}\right)^2 \left[\left(\frac{\delta\lambda}{\lambda_{00}}\right)^2 - \frac{\delta d}{d_{00}}\right]^2. \quad (16)$$

Figure 16:
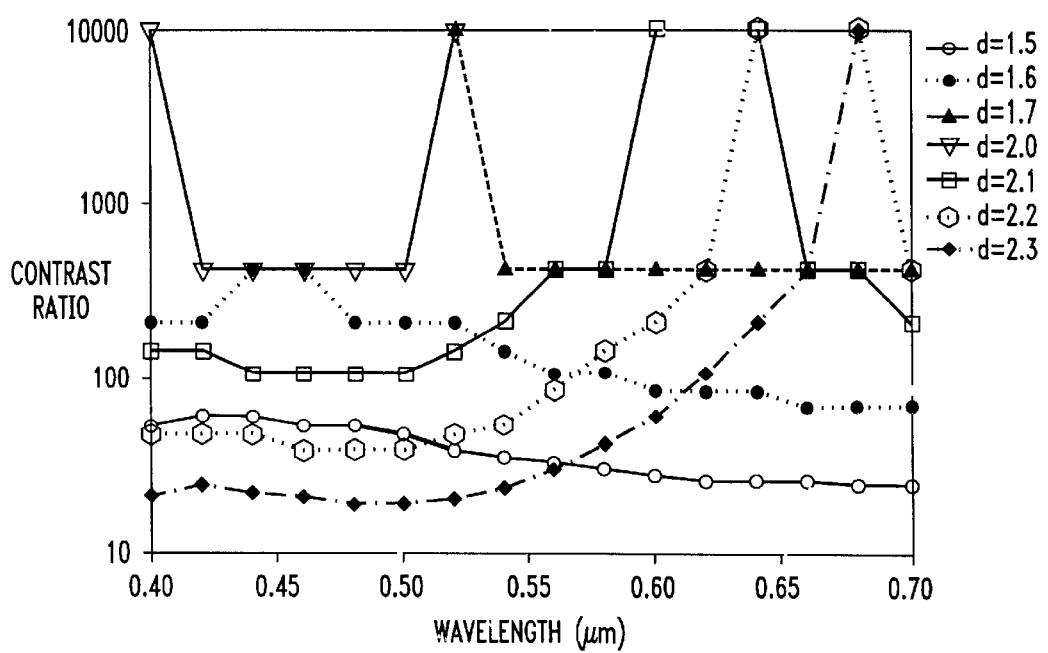
FIG. 16 is a graph illustrating contrast versus wavelength responses associated with a lightvalve according to an embodiment of the present invention.
Figure 17:
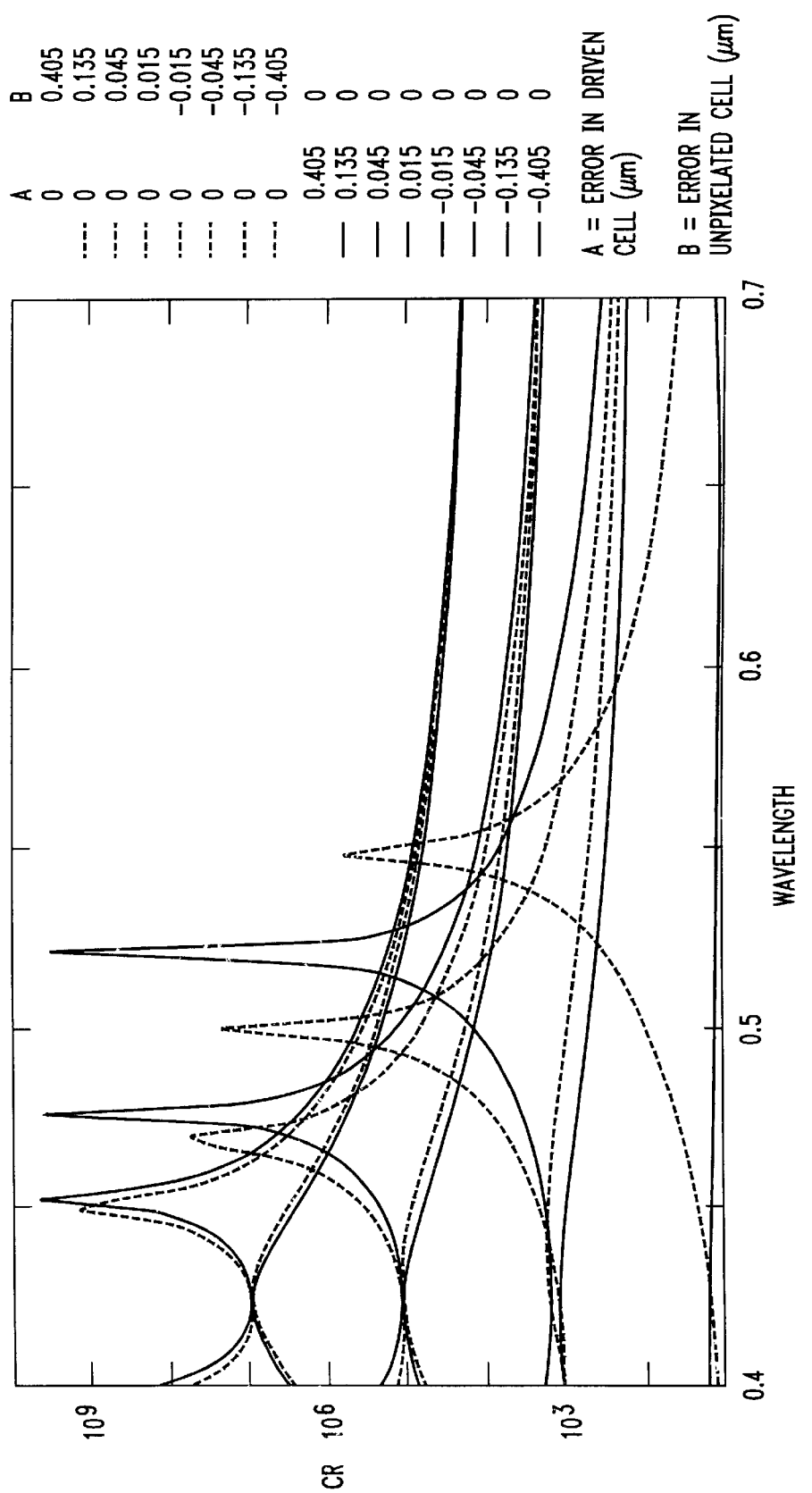
FIG. 17 is a graph illustrating the reciprocal of black state reflectivity versus wavelength responses associated with a lightvalve according to an embodiment of the present invention.

The second (lowest order) form of equation (16) shows that when the driven LC layer has a larger cell gap than the second layer (i.e., when $\delta$d>0), the black state will go to zero at two particular values of $\delta\lambda$, one of which (the positive root) may lie within the lightvalve's operating range. On the other hand, when non-uniformity is such that $\delta$d<0, black state intensity does not have a wavelength zero, and indeed is relatively insensitive to wavelength, as we would expect from the achromatic voltage response. This behavior is illustrated in FIGS. 16 and 17. The reciprocal of black state reflectivity (denoted CR, essentially the contrast ratio) is plotted. The curves of FIG. 16 take into account (at NA=0) the detailed response of the LC throughout its thickness. Note that in FIG. 16, the very largest contrast ratios are rounded to discrete levels.

Figure 18:
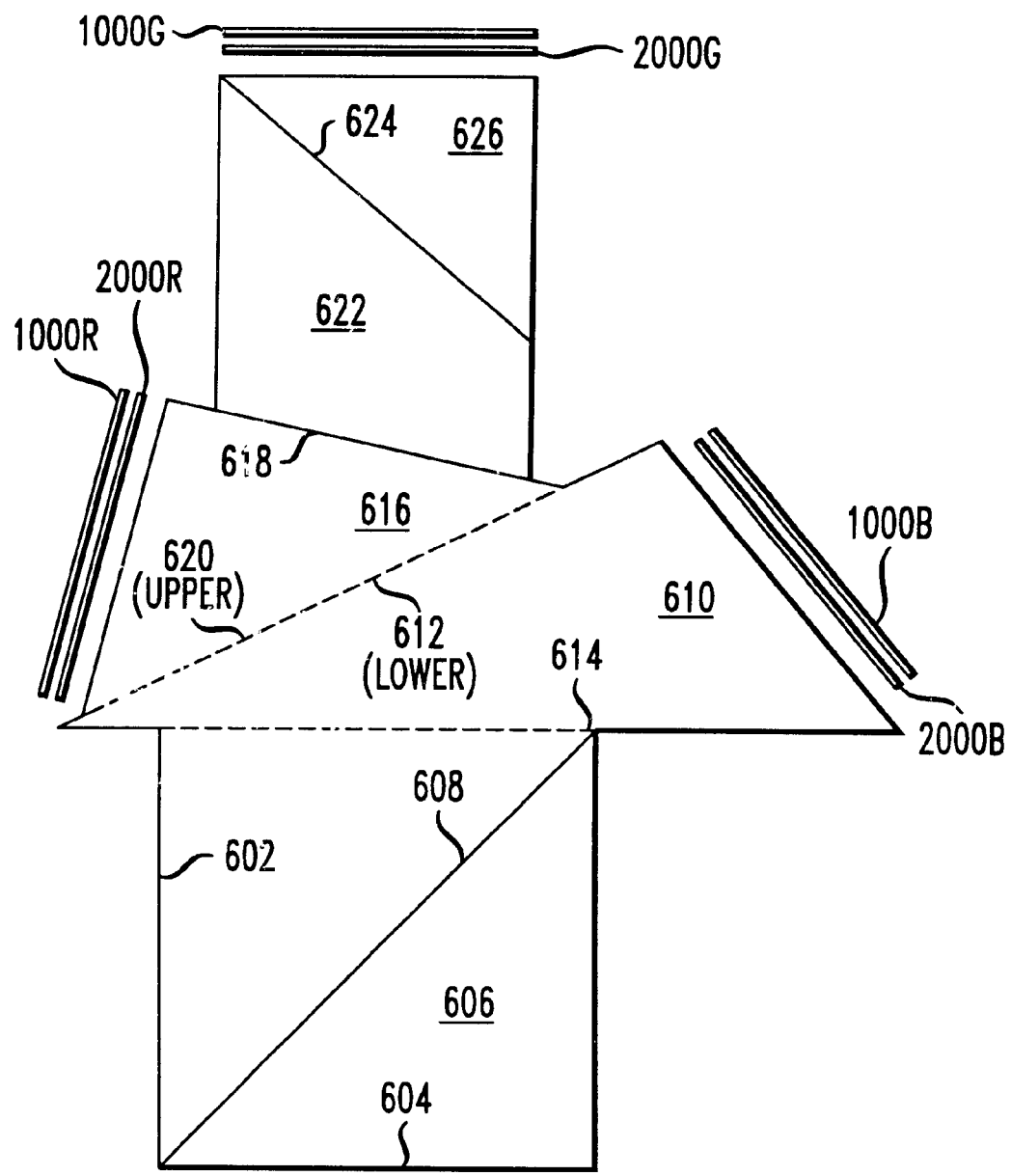
FIG. 18 is a PBS optical system employing LC structures according to an embodiment of the present invention.

Referring now to FIG. 18, a 1-PBS (polarizing beamsplitter) optical system is shown using double-celled lightvalves according to the invention for red (1000R, 2000R), green (1000G, 2000G) and blue (1000B, 2000B). An illuminating light beam enters PBS cube 606 through face 602, and is reflected by polarizing coating 608 into prism 610. Dichroic coating 612 at the back face of prism 610 reflects a first primary color (for example, blue), and transmits the other two (e.g., green and red). The reflected first color, e.g., blue, is incident at air gap 614 (of thickness ~15 microns, for example) at an angle above critical; it is thus reflected to lightvalve 1000B, 2000B, which is a band shifted double LC structure according to the present invention (e.g., of the kind 1000, 2000 shown in FIG. 6A, although alternative embodiments and variations may be employed). After modulation by this lightvalve, the beam retraces its path through the FIG. 18 coatings in reverse sequence, except that rays which are switched to bright state will exit through face 604 of PBS 606, rather than through incident face 602. However, dark state rays are returned to the source through face 602. In similar fashion, dichroic coating 618 of prism 616 reflects a second primary color (for example, red), while transmitting the third color (e.g., green). The reflected second color is incident at air gap 620 at an angle above critical, directing it to a second band shifted double LC lightvalve (1000R, 2000R) that is addressed with the image content for the second color. The transmitted third color (e.g., green) illuminates a third band shifted double LC lightvalve (1000G, 2000G) after passing through prism 622, phase corrective coating 624, and prism 626. The differential phase shift from coating 624 is chosen to cancel rotation of the light polarization that illuminates LC layer 2000G. Such a rotation can be introduced by tilted coatings 608, 612, and 618, as well as by air gap 620. These coatings may also introduce ellipticity in the illuminating light, but ellipticity is canceled when the coatings on prisms 626, 622, 616, 610, and PBS 606 are re-traversed in reverse sequence.

Figure 19:
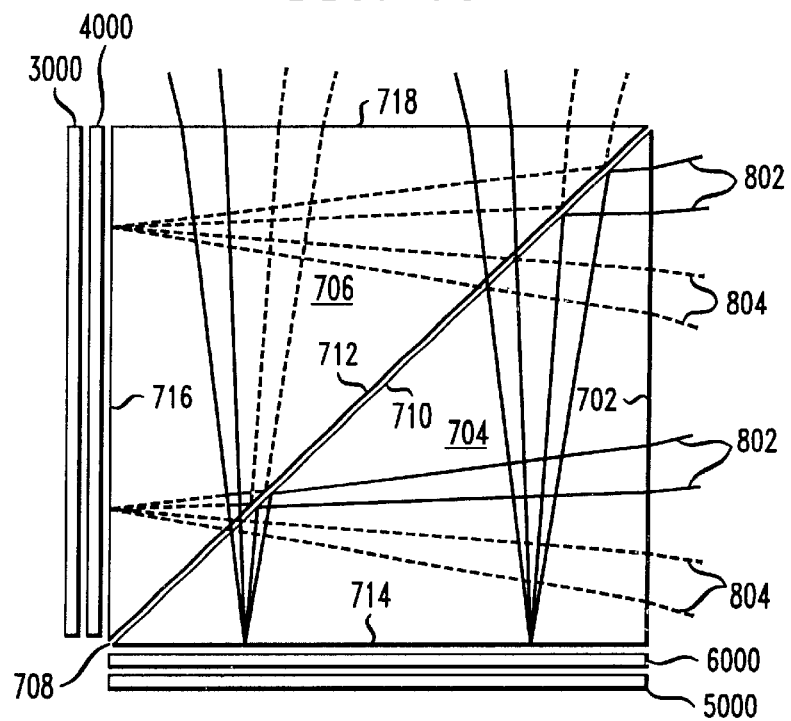
FIG. 19 is a two lightvalve optical system employing LC structures according to an embodiment of the present invention.

Referring now to FIG. 19, a two lightvalve optical system is shown of the kind disclosed in U.S. Ser. No. 09/085,065, filed on May 27, 1998, the disclosure of which is incorporated by reference herein, here using a pair of double-celled lightvalves according to the present invention, i.e., double-celled lightvalve 3000, 4000 and double-celled lightvalve 5000, 6000 (e.g., each of the kind 1000, 2000 shown in FIG. 6A, although alternative embodiments and variations may be employed). An illuminating beam comprising rays such as 804 (dashed rays) and 802 (shown solid) enters prism 704 through face 702. The 802 rays are incident at air gap 708 above the critical angle (while the 804 rays are incident below critical); thus the 802 rays are reflected to a band-shifted double LC structure 5000, 6000 at face 714. Layers 5000 and 6000 are preferably violet shifted in order to provide a broadband response of the kind shown in FIG. 12A, thus allowing the 5000, 6000 lightvalve to project all three primary colors (R, G, and B). These colors are sequentially assigned to rays 802, i.e., rays 802 are sequentially colored R, G, and B using, e.g., filters. After modulation by lightvalve 5000, 6000, rays 802 are re-incident at air gap 708 at an angle below critical, and so are transmitted through prism 706 to exit face 718. Transmission through air gap 708 is enhanced by anti-reflection coatings 710 and 712.

Rays 804 are assigned a different color from rays 802. Rays 804 are incident on air gap 708 below critical, and so are transmitted to violet-shifted double LC structure 3000, 4000 at face 716. After modulation, the rays are returned to air gap 708 at an angle above critical, and thus are reflected to exit face 718.

Two colors are projected by the combined system at any one instant (unless slow lightvalve response mandates brief periods of "dead time," during which a lightvalve is left un-illuminated while being reset with image information for the next frame or subframe). The illuminating colors are switched sequentially in order to project the three primary colors required in the image. Suppose, for example, that the frame rate is 67 Hz, i.e., the frame time is 15 milliseconds (msec). Each R, G, B subframe is projected for ⅔ of a frame time, i.e., for 10 msec (neglecting dead time for simplicity). In the interval between t=−10 msec and t=0, rays 802 might, for example, be colored red to project the R subframe of a particular image frame (say, the Nth), while between t=0 and t=+10msec, the 802 rays could be colored blue to project the B subframe of image frame N. Rays 804 would then be colored green between t=−5 msec and t=+5 msec, in order to project the G subframe of image frame N. Though frame N data is thus projected between t=−10 msec and t=+10 msec, the frames are overlapped by staggering the color assignments to the two lightvalves. Thus, rays 804 could be colored B between t=−15 msec and t=−5 msec in order to project the B subframe of image frame N−1, while between t=+5 msec and t=+15 msec, the 804 rays would be colored R to project the R subframe of image frame N+1. Similarly, rays 802 would be colored green between t=−20 msec and t=−10 msec, and also between t=+10 msec and t=+20 msec, in order to project the G subframes of image frames N−1 and N+1, respectively. The midpoints of image frames N−1, N, N+1, . . . , thus occur at t=−15 msec, t=0, t=+15 msec, . . . , thereby providing the desired 67 Hz frame rate.

Per the discussion of equation (12) above, it is to be appreciated that a key aspect of the blue-shifted LC layers of the present invention is that they are effectively switched "partly on" at operating wavelengths. This is because the same optical effect is invoked whether dΔn is decreased by reducing Δn (through application of voltage), or by reducing d (blue-shifting).

Thus, embodiments of the invention are possible in which the component cells are shifted towards the bright state by other means other than reduction in d, for example, by an increased LC pre-tilt or by application of a small bias AC voltage in black state. As in the above-disclosed embodiments, the structure as a whole provides an extremely good black state even though the constituent layers are shifted towards bright.

For example, the dΔn product of the unpixelated layer can be set to match that of the pixelated layer in black state after the pixelated layer is driven with a bias voltage slightly above threshold. This bias voltage increases the turn-on speed of the driven LC, yet does not degrade contrast of the double cell.

If the chosen bias voltage is small, the dΔn values of the two cells can be matched by offsetting the cell gaps. The matching can be fine-tuned by adjustment of the bias voltage. Alternatively, identical bias voltages can be applied to the pixelated and unpixelated layers. In the latter case, the structure can be used in a color sequential mode, with voltage switched off between pixels to avoid an increase in turn-off time.

While, in this embodiment, a fixed voltage is applied across the unpixelated layer, and an identical bias voltage is applied to the pixelated layer when the lightvalve is in black state, it should be noted that if the pixelated and unpixelated layers do not precisely satisfy $\alpha'=-\alpha$, $\beta'_{00}=-\beta_{00}$ under identical voltages (or at zero voltage), the small mismatch may be compensated by applying unequal voltages. For example, in a color sequential system where materials with slightly different spectral dispersions are used in the pixelated and unpixelated layers, the voltage across the unpixelated layer can be adjusted in real-time to compensate the mismatch, thereby maximizing contrast in each color as it is projected.

Figure 20:
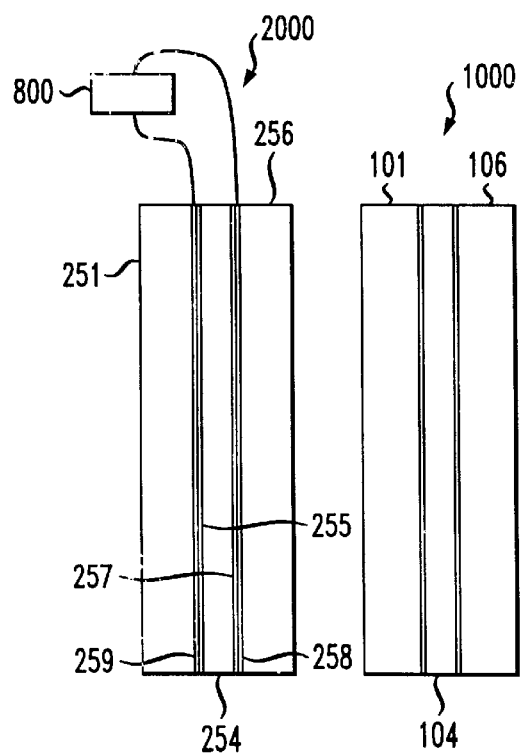
FIG. 20 is a lightvalve optical system employing LC structures according to another embodiment of the present invention.

Thus, referring to FIG. 20, transparent conductive films 258 and 259 are provided in upper cell 2000, enabling a tuning electric field to be applied across LC layer 254 by controller 800 (which contains an AC voltage supply). Conductive films 258 and 259 may be halfwave layers of indium tin oxide (ITO), approximately 140 nanometers (nm) in thickness. Alternatively, bi-layer conductive films may be used, each comprising a thinner ITO layer for improved transparency, as well as a second layer of similar refractive index (such as $Ta_2O_5$) to provide halfwave total optical thickness. Additional layers may be included to improve broadband transmittance of each conductive film; for example, each film might comprise 20 nm of $Ta_2O_5$, 30 nm of $SiO_2$, 95 nm of $Ta_2O_5$, and 50 nm of ITO. Typical output for supply 800 might be 1V RMS (Volts root mean square) at 90 Hz (Hertz).

Figure 21:
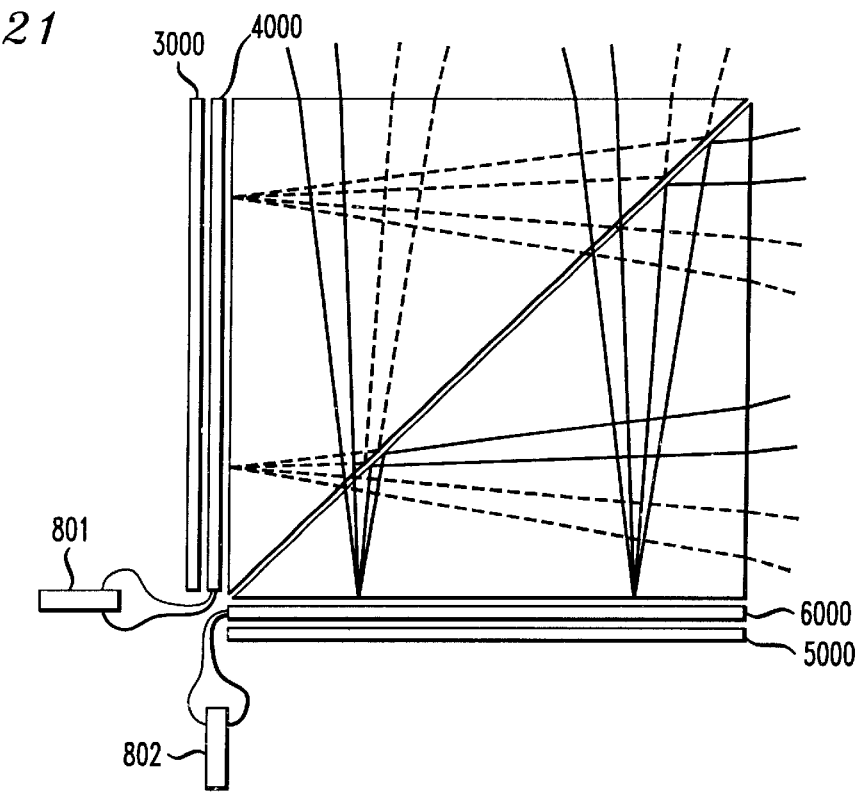
FIG. 21 is a lightvalve optical system employing LC structures according to yet another embodiment of the present invention.

FIG. 21 shows how two voltage controllers 801 and 802 can be implemented in a two lightvalve projector. The $d\Delta n$ products of upper cells 4000 and 6000 are adjusted during each subframe to compensate, for example, for differential dispersion between the upper and lower LC layers (4000 versus 3000, and 6000 versus 5000). The appropriate voltage adjustments may be determined empirically by measuring the RMS applied field which provides the highest contrast in each color band.

Figure 22:
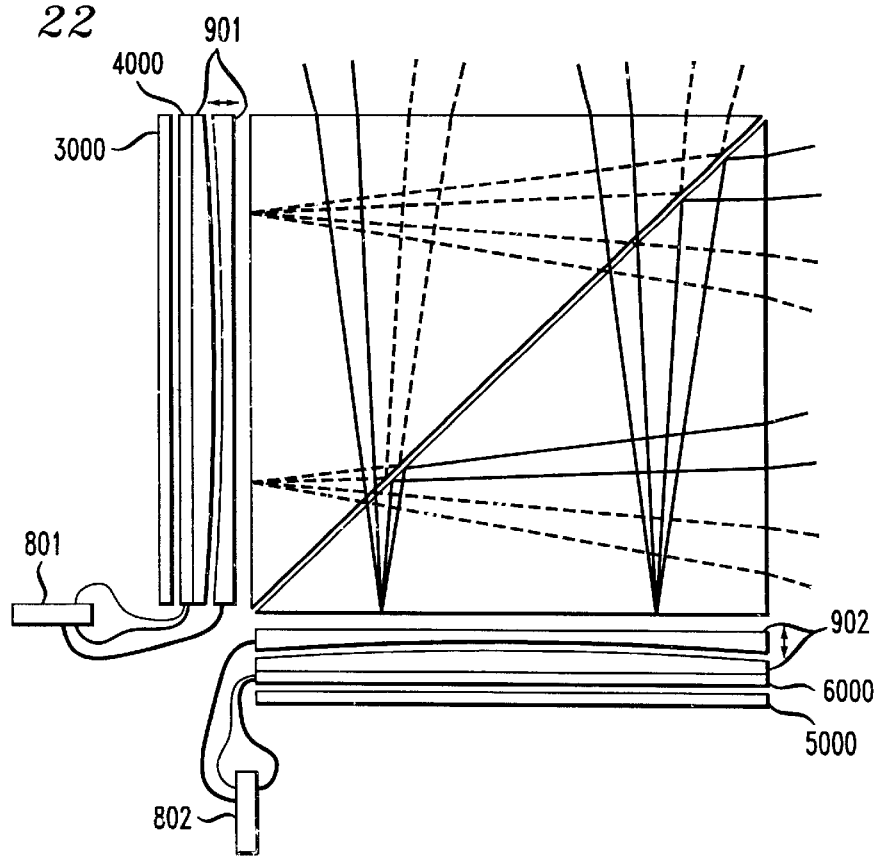
FIG. 22 is a lightvalve optical system employing LC structures according to a further embodiment of the present invention.
Figure 23:
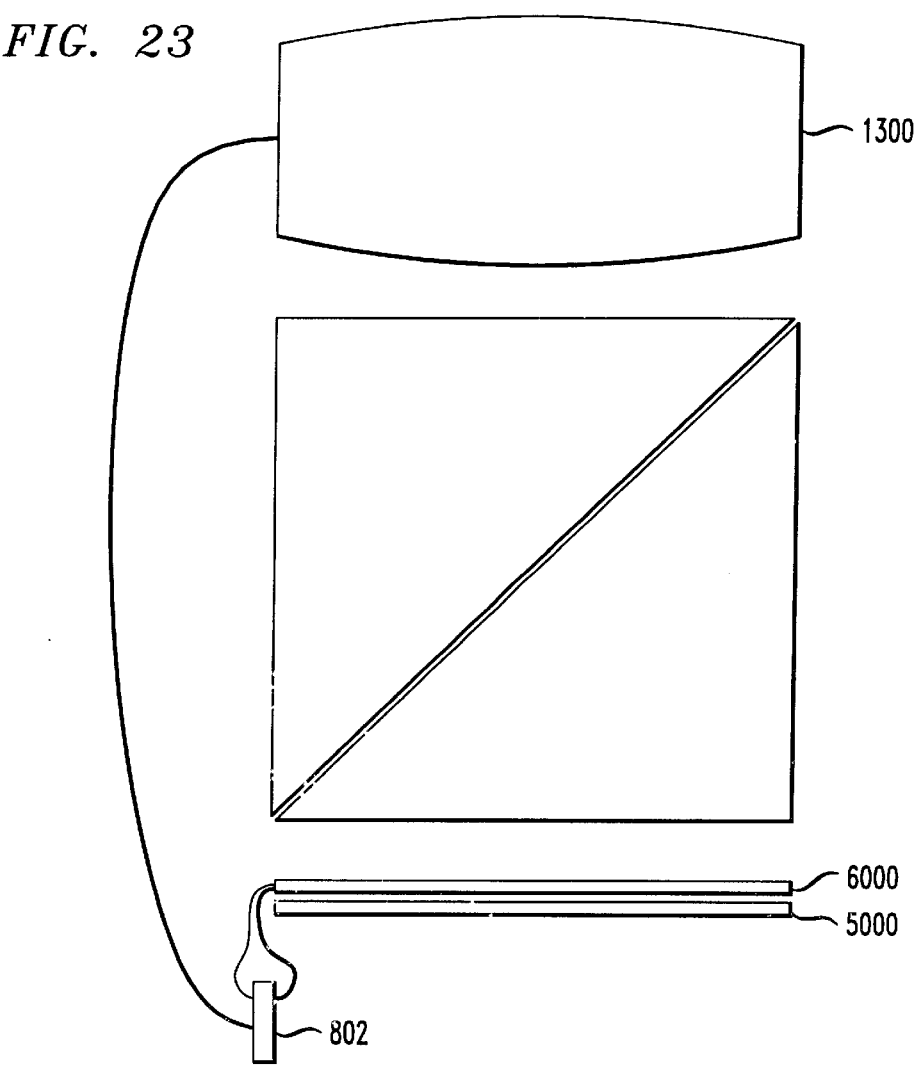
FIG. 23 is a lightvalve optical system employing LC structures according to still a further embodiment of the present invention.

The lightvalves preferably operate in a near-telecentric space. In such systems, longitudinal chromatic aberration is considerably easier to control than lateral color, and magnification does not vary with object focal position. FIG. 22 shows an embodiment in which upper cells 6000 and 4000 are mounted on lens groups 901 and 902, which are driven, e.g., by a cam or piezo actuator to provide a synchronized magnification adjustment. Only a small magnification adjustment is typically needed to correct residual lateral color, for example, about +/−0.1%. In single LV implementations, like that shown in FIG. 23, the magnification adjustment may take place anywhere within projection lens 1300.

Another embodiment of the invention uses LC layers in tilted homeotropic alignment. Methods which produce homeotropic alignment that is robust may also appreciably tilt the LC molecules away from true perpendicularity. In this case, the LC layers are shifted towards the bright state. Moreover, even the small pre-tilts (~3°) that are required in conventional cells to achieve uniform single-domain alignment will produce a non-negligible shift towards bright state in rays that are steeply incident. This reduces the range of illumination angles that can be used in conventional homeotropic lightvalves, hence limiting projector brightness. A structure according to the invention comprising two vertically aligned layers with appreciable pre-tilt will exhibit better black state than the conventional single layer if the pre-tilt is of the order of 10 degrees (though black state angular range may degrade at very large pre-tilts, due to the doubled thickness). If process drifts cause the pre-tilt in either layer to depart from nominal, the pair can be matched by offsetting the drive voltage; alternatively, matching may be accomplished by appropriate sorting and pairing from an inventory of cells.

The coupling between LC and applied field is approximately quadratic in pre-tilt angle. At low pre-tilt angle, the LC elastic restoring force will dominate the electric force at typical drive voltages, and turn-on is delayed by the need for thermal fluctuations to initiate the LC motion. A cell that is "partly on" at zero drive by virtue of large pre-tilt will thus exhibit faster turn-on time than a conventional cell. The increased coupling will also reduce the large threshold in voltage which must be overcome in order to further tilt the LC molecules (i.e., to increase brightness). Thus, drive voltage requirements are eased by large pre-tilt. A double cell structure comprising layers appreciably tilted (e.g., of order 10 degrees) from either nominally homogeneous or nominally homeotropic alignment will avoid the black state light leakage normally arising from large pre-tilt.

When adjacent pixels in a displayed image are driven with unequal voltages, the resulting fringing fields between the pixels gives rise to deformations in the LC. That is, as one moves away from the maximum field region at pixel center towards the boundary of a pixel, the LC orientation will become progressively distorted. Disclination boundaries form when these deformations are in incompatible directions between adjacent pixels. Such disclinations detract from image brightness and may be perceived as artifacts in the displayed image. The high pre-tilt bias that can be employed in lightvalves of the present invention provides a degree of immunity to disclination formation, in that the disclinations can only form in the low reflectivity regions between the mirrors where the strongly coupled field is weak. The disinclinations are driven away from the high reflectivity regions where the field is stronger.

Another advantage of the double cell LC structure of the invention is that it can provide high contrast in circular polarized light. Contrast with conventional TN cells is poor if the input is circular polarized, because in this case black state intensity scales quadratically with detuning $\delta\lambda$, rather than quartically as with linear polarization (see equation (14) above).

Figure 24:
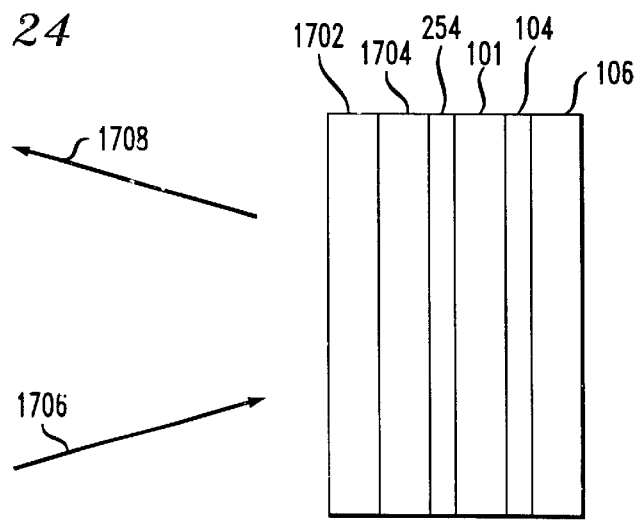
FIG. 24 is a diagram illustrating an LC structure according to another embodiment of the present invention.

This advantage can be exploited even when the projection system provides illumination that is linear polarized (the usual case). FIG. 24 shows a lightvalve of the present invention that uses a QWP 1704 to provide circular polarized input to a double cell LC structure, for an input beam 1706 that is linear polarized. Input beam 1706 is polarized either horizontally or vertically (in other words, its polarization is rectilinear with the edges of the projected image), and before reaching QWP 1704, it is passed through a linear polarizer 1702 whose transmission axis has a matching horizontal or vertical orientation (i.e., it is set to pass beam 1706). Polarizer 1702 trims away any mis-polarized component in beam 1706 which might arise, for example, from compound angle depolarization in the optics. After passing through polarizer 1702, beam 1706 is converted to circular polarization by QWP 1704, whose axes are oriented at 45°. The circular polarized beam then passes through an outer LC layer 254, which may, for example, be a polymerized LC layer. The beam then traverses spacer substrate 101 and inner LC layer 104, to reach pixelated backplane 106. If the backplane pixels are set to black state, the return beam 1708 returns to QWP 1704 in a circular polarization with opposite handedness to that in the input pass. Its polarization upon reaching linear polarizer 1702 is therefore rotated 90° relative to the input polarization of beam 1706. Return beam 1708 is thus blocked by polarizer 1702 when in black state. On the other hand, in bright state, beam 1708 is passed by polarizer 1702 in a polarization parallel to the input. Since beam 1708 in bright state (the image beam) and the illumination beam 1706 have the same polarization state, they must be separated on the basis of direction rather than polarization, which may be accomplished by illuminating the lightvalve at a slightly oblique angle (such as about 10°), as shown in FIG. 24.

In most projectors, the beams which reflect from the lightvalves contain both bright and dark polarization states, and both beam components propagate together through a portion of the optical system until the dark state component is removed by a PBS. Conventional projectors are therefore vulnerable to polarization mixing from tilted coatings (like the PBS), potentially degrading contrast. However, the FIG. 24 configuration does not suffer this vulnerability since the returned dark state component is removed in the lightvalve itself, by polarizer 1702.

In a further embodiment, two lightvalve configurations can use a PBS to perform the beam dividing function, rather than a TIR (total internal reflection) prism, for example as disclosed in U.S. Pat. No. 5,921,650 to Doany and Rosenbluth, the disclosure of which is incorporated by reference herein. Thus, variations of the embodiments in FIGS. 19, 21 and 22 are possible in which the TIR prism is replaced by a PBS cube. The hypotenuse coating directs illuminating light to one lightvalve or the other on the basis of polarization. The coating then directs bright-switched light (from either lightvalve) to the exit face, while returning light from dark-switched pixels to the source. A PBS can also replace the TIR prism in the single lightvalve configuration of FIG. 23.

It is to be appreciated that the invention is not limited to double layers which achieve the "partly on" condition at zero drive voltage. For example, it is possible to operate a pair of "mixed TN (MTN) mode" LC layers as a normally black double structure of the present invention. Like the known normally white MTN single layer, the new double structure provides very fast switching speed, but unlike the conventional MTN it is insensitive to black-matrix quality. Moreover, it achieves a high quality black state even when available drive voltage is limited.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A reflective liquid crystal lightvalve for modulating the polarization of incident light within a specified band of wavelengths into on and off states, the lightvalve comprising:
   a pixelated reflective backplane;
   a first liquid crystal layer, positioned proximate the pixelated reflective backplane, the first liquid crystal layer being tuned in the off state to switch incident light at the center of the specified band of wavelengths into a state that is not fully off; and
   a second liquid crystal layer, positioned proximate the first liquid crystal layer wherein the first liquid crystal layer is positioned between the second liquid crystal layer and the pixelated reflective backplane, the second liquid crystal layer having a birefringence which, at a given depth within its thickness, is substantially equal and opposite to a birefringence of a layer within the first liquid crystal layer that is located at a matching distance from a midplane separating the first and second liquid crystal layers.

2. The reflective liquid crystal lightvalve of claim 1, wherein the first liquid crystal layer is a twisted nematic layer that is tuned in the off state to fully switch off light of a wavelength that is shorter than the central wavelength of the specified band of wavelengths.

3. The reflective liquid crystal lightvalve of claim 2, wherein the orientation of liquid crystal molecules in a plane at a given depth of the second liquid crystal layer, when projected onto said plane, is substantially perpendicular to the projected orientation of liquid crystal molecules of the first liquid crystal layer in a plane that is located at a matching distance from a midplane separating the first and second liquid crystal layers.

4. The reflective liquid crystal lightvalve of claim 1, wherein the second liquid crystal layer is tilted with respect to the first liquid crystal layer.

5. The reflective liquid crystal lightvalve of claim 1, wherein the first and second liquid crystal layers are separated by at least one substrate.

6. The reflective liquid crystal lightvalve of claim 5, wherein the at least one substrate is formed by cementing together two separate substrates.

7. The reflective liquid crystal lightvalve of claim 6, wherein one of the two separate substrates is associated with the first liquid crystal layer and another of the two separate substrates is associated with the second liquid crystal layer.

8. The reflective liquid crystal lightvalve of claim 1, wherein the second liquid crystal layer is polymerized.

9. The reflective liquid crystal lightvalve of claim 1, further comprising a halfwave layer positioned between the first and second liquid crystal layers.

10. The reflective liquid crystal lightvalve of claim 1, wherein the first and second liquid crystal layers provide an achromatic response across the visible spectrum.

11. The reflective liquid lightvalve of claim 2, wherein the wavelength that is fully switched off is a violet light wavelength.

12. The reflective liquid crystal lightvalve of claim 1, wherein the second liquid crystal layer is rotated with respect to the first liquid crystal layer.

13. The reflective liquid crystal lightvalve of claim 1, wherein the second liquid crystal layer comprises a conductive layering for application of an electric field across the second liquid crystal layer.

14. The reflective liquid crystal lightvalve of claim 13, wherein the conductive layering comprises two conductive films placed on opposing sides of the second liquid crystal layer.

15. The reflective liquid crystal lightvalve of claim 14, wherein each film is comprised of at least two layers.

16. The reflective liquid crystal lightvalve of claim 15, wherein one of the two layers of the film is an indium tin oxide layer.

17. The reflective liquid crystal lightvalve of claim 15, wherein one of the two layers of the film is configured to provide a halfwave total optical thickness.

18. The reflective liquid crystal lightvalve of claim 13, wherein the electric field across the second liquid crystal layer is switchably applied such that the lightvalve is operated in a color sequential mode.

19. The reflective liquid crystal lightvalve of claim 1, wherein the first and second liquid crystal layers are in tilted homeotropic alignment.

20. The reflective liquid crystal lightvalve of claim 1, further comprising a quarterwave plate positioned proximate the second liquid crystal layer wherein the second liquid crystal layer is positioned between the quarterwave plate and the first liquid crystal layer.

21. The reflective liquid crystal lightvalve of claim 20, further comprising a polarizer positioned proximate the quarterwave plate wherein the quarterwave plate is positioned between the polarizer and the second liquid crystal layer.

22. An optical system, comprising:

at least one reflective liquid crystal lightvalve for modulating the polarization of incident light within a specified band of wavelengths into on and off states, the lightvalve comprising: (i) a pixelated reflective backplane; (ii) a first liquid crystal layer, positioned proximate the pixelated reflective backplane, the first liquid crystal layer being tuned in the off state to switch incident light at the center of the specified band of wavelengths into a state that is not fully off; and (ii) a second liquid crystal layer, positioned proximate the first liquid crystal layer wherein the first liquid crystal layer is positioned between the second liquid crystal layer and the pixelated reflective backplane, the second liquid crystal layer having a birefringence which, at a given depth within its thickness, is substantially equal and opposite to a birefringence of a layer within the first liquid crystal layer that is located at a matching distance from a midplane separating the first and second liquid crystal layers; and an optics subsystem, positioned proximate the at least one lightvalve, for receiving an input light signal, directing at least a portion of the input light signal towards the lightvalve such that the lightvalve modulates the portion of the input light signal and projects an output light signal in response thereto, the optics subsystem directing the output light signal through an exit surface associated therewith.

23. The optical system of claim 22, further comprising an adjustable lens mechanism for magnifying the output light signal.

24. A liquid crystal structure for use in an optical lightvalve, the structure comprising:

a first liquid crystal layer; and a second liquid crystal layer, positioned proximate the first liquid crystal layer, each layer being band-shifted to produce a maximum contrast in the layer at a wavelength shorter than a central operating wavelength for the structure, wherein one of the layers is undriven and the other of the layers is driven, the undriven layer being rotatable relative to the driven layer.

25. A liquid crystal structure for use in an optical lightvalve, the structure comprising:

a first twisted nematic liquid crystal layer;

a second twisted nematic liquid crystal layer, positioned proximate the first layer; and a quarterwave retarder, positioned proximate the first and second layers, each twisted nematic layer being set to a thickness that provides, from the individual layer, an optimum projected black state at shorter wavelengths than a wavelength band of interest.

* * * * *

UNITED STATES PATENT AND TRADEMARK OFFICE
CERTIFICATE OF CORRECTION

PATENT NO. : 6,650,383 B1
DATED : November 18, 2003
INVENTOR(S) : M. Lu et al.

It is certified that error appears in the above-identified patent and that said Letters Patent is hereby corrected as shown below:

Column 8,
Line 18, $$"\ \frac{I-\left(\frac{\beta_{00}}{\pi}\right)^2\left[\frac{\delta(d\Delta n)'}{(d\Delta n)_{00}}-\frac{\delta\lambda}{\lambda_{00}}\right]\begin{pmatrix}i\beta_{00} & a \\ -a & -i\beta_{00}\end{pmatrix}=}{I+\left(\frac{\beta_{00}}{\pi}\right)^2\left[\frac{\delta(d\Delta n)'}{(d\Delta n)_{00}}-\frac{\delta\lambda}{\lambda_{00}}\right]\begin{pmatrix}-i\beta_{00} & -a \\ a & i\beta_{00}\end{pmatrix}}\ "\ \text{should be}$$

$$--\ \frac{I-\left(\frac{\beta_{00}}{\pi}\right)^2\left[\frac{\delta(d\Delta n)'}{(d\Delta n)_{00}}-\frac{\delta\lambda}{\lambda_{00}}\right]\begin{pmatrix}i\beta_{00} & \alpha \\ -\alpha & -i\beta_{00}\end{pmatrix}=}{I+\left(\frac{\beta_{00}}{\pi}\right)^2\left[\frac{\delta(d\Delta n)'}{(d\Delta n)_{00}}-\frac{\delta\lambda}{\lambda_{00}}\right]\begin{pmatrix}-i\beta_{00} & -\alpha \\ \alpha & i\beta_{00}\end{pmatrix}}\ --.$$

Line 45, " $R(\alpha)XR(\alpha')=\begin{pmatrix}e^{i\varphi} & 0 \\ 0 & e^{-i\varphi}\end{pmatrix},$ " should be -- $R(\alpha)XR(\alpha')=\begin{pmatrix}e^{i\varphi} & 0 \\ 0 & e^{-i\varphi}\end{pmatrix},$ --.

Line 51, "$\phi$" should be -- $\varphi$ --.

Line 56, " $\frac{\partial}{\partial\lambda}\left\{\left(R(-\alpha)[R(\alpha)M_{Single,LC}]R(\alpha)\right)X[R(\alpha')M'_{Single}]\right\}=0,$ " should be -- $\frac{\partial}{\partial\lambda}\left\{\left(R(-\alpha)[R(\alpha)M_{Single,LC}]R(\alpha)\right)X[R(\alpha')M'_{Single}]\right\}=0,$ --.

Lines 64 and 65, "$\phi$" should be -- $\varphi$ --.
Line 66, "$\beta'_{oo=-\beta oo}$" should be -- $\beta'_{00}=-\beta_{00}$ --.

Column 9,
Line 33, $$"\ B=\frac{a^2}{\gamma^2\gamma'^2}\left[2\frac{\beta-\beta'}{\gamma\gamma'}\left(\beta\beta'\sin^2\gamma+a^2\sin^2\gamma'\right)+\beta\left(\left[1-\frac{a^2+\beta\beta'}{\gamma\gamma'}\right]\sin^2[\gamma+\gamma']-\left[1+\frac{a^2+\beta\beta'}{\gamma\gamma'}\right]\sin^2[\gamma-\gamma']\right)\right]^2\ +$$

$$\frac{NA^2}{n^2}\left[a^2\frac{\beta-\beta'}{\gamma\gamma'}\sin 2\gamma+\frac{\beta}{\gamma}\left(\left[1+\frac{a^2+\beta\beta'}{\gamma\gamma'}\right]\sin 2(\gamma-\gamma')-\left[1-\frac{a^2+\beta\beta'}{\gamma\gamma'}\right]\sin 2(\gamma+\gamma')\right)\right]^2\ "$$

should be $$--\ B=\frac{\alpha^2}{\gamma^2\gamma'^2}\left[2\frac{\beta-\beta'}{\gamma\gamma'}\left(\beta\beta'\sin^2\gamma+\alpha^2\sin^2\gamma'\right)+\beta\left(\left[1-\frac{\alpha^2+\beta\beta'}{\gamma\gamma'}\right]\sin^2[\gamma+\gamma']-\left[1+\frac{\alpha^2+\beta\beta'}{\gamma\gamma'}\right]\sin^2[\gamma-\gamma']\right)\right]^2\ +$$

$$\frac{NA^2}{n^2}\left[\alpha^2\frac{\beta-\beta'}{\gamma\gamma'}\sin 2\gamma+\frac{\beta}{\gamma}\left(\left[1+\frac{\alpha^2+\beta\beta'}{\gamma\gamma'}\right]\sin 2(\gamma-\gamma')-\left[1-\frac{\alpha^2+\beta\beta'}{\gamma\gamma'}\right]\sin 2(\gamma+\gamma')\right)\right]^2\ --.$$

UNITED STATES PATENT AND TRADEMARK OFFICE
CERTIFICATE OF CORRECTION

PATENT NO. : 6,650,383 B1
DATED : November 18, 2003
INVENTOR(S) : M. Lu et al.

It is certified that error appears in the above-identified patent and that said Letters Patent is hereby corrected as shown below:

Column 10,
Line 20,

" $I \cong \left(\dfrac{2\alpha\beta_{00}^5}{\pi^4}\right)^2 \left(\dfrac{\delta(\Delta n)}{\Delta n_{00}}\right)^2 \left[\left(\dfrac{\delta\lambda}{\lambda_{00}} + \dfrac{1}{2}\dfrac{\delta(\Delta n)}{\Delta n_{00}}\right)^2 - \left(\dfrac{\delta(\Delta n)}{\Delta n_{00}}\right)\left(1 + \dfrac{1}{4}\dfrac{\delta(\Delta n)}{\Delta n_{00}}\right)\right]^2 $ "

should be

-- $I \cong \left(\dfrac{2\alpha\beta_{00}^5}{\pi^4}\right)^2 \left(\dfrac{\delta(\Delta n)}{\Delta n_{00}}\right)^2 \left[\left(\dfrac{\delta\lambda}{\lambda_{00}} + \dfrac{1}{2}\dfrac{\delta(\Delta n)}{\Delta n_{00}}\right)^2 - \left(\dfrac{\delta(\Delta n)}{\Delta n_{00}}\right)\left(1 + \dfrac{1}{4}\dfrac{\delta(\Delta n)}{\Delta n_{00}}\right)\right]^2 $ --.

Column 14,
Line 49,

" $I \cong \left(\dfrac{2\alpha\beta_{00}^5}{\pi^4}\right)^2 \left(\dfrac{\delta d}{d_{00}}\right)^2 \left[\left(\dfrac{\delta\lambda}{\lambda_{00}} + \dfrac{1}{2}\delta\dfrac{d}{d_{00}}\right)^2 - \left(\dfrac{\delta d}{d_{00}}\right)\left(1 + \dfrac{1}{4}\delta\dfrac{d}{d_{00}}\right)\right]^2 \approx \left(\dfrac{2\alpha\beta_{00}^5}{\pi^4}\right)^2 \left(\dfrac{\delta d}{d_{00}}\right)^2 \left[\left(\dfrac{\delta\lambda}{\lambda_{00}}\right)^2 - \dfrac{\delta d}{d_{00}}\right]^2 $ "

should be

-- $I \cong \left(\dfrac{2\alpha\beta_{00}^5}{\pi^4}\right)^2 \left(\dfrac{\delta d}{d_{00}}\right)^2 \left[\left(\dfrac{\delta\lambda}{\lambda_{00}} + \dfrac{1}{2}\dfrac{\delta d}{d_{00}}\right)^2 - \left(\dfrac{\delta d}{d_{00}}\right)\left(1 + \dfrac{1}{4}\dfrac{\delta d}{d_{00}}\right)\right]^2 \approx \left(\dfrac{2\alpha\beta_{00}^5}{\pi^4}\right)^2 \left(\dfrac{\delta d}{d_{00}}\right)^2 \left[\left(\dfrac{\delta\lambda}{\lambda_{00}}\right)^2 - \dfrac{\delta d}{d_{00}}\right]^2 $ --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,650,383 B1
DATED : November 18, 2003
INVENTOR(S) : M. Lu et al.

It is certified that error appears in the above-identified patent and that said Letters Patent is hereby corrected as shown below:

Column 1,
Line 33, "$d=(\lambda/\Delta n)\sqrt{m^2-(\alpha/\pi)^2}$" should be -- $d=(\lambda/\Delta n)\sqrt{m^2-(\alpha/\pi)^2}$ --.

Column 2,
Lines 2, 6, 31 and 42, "N" should be -- n --.

Line 58, "$\Theta'=a\frac{\tan\gamma}{\gamma}$" should be -- $\Theta'=a\frac{\tan\gamma}{\gamma}$ --.

Line 63, "$\lambda\equiv\sqrt{\alpha^2+\beta^2}$." should be -- $\gamma\equiv\sqrt{\alpha^2+\beta^2}$. --

Column 3,
Line 10, "$B_{system} = \left(\frac{2\alpha\beta\sin^2\gamma}{\gamma^2}\right)^2 + \frac{NA^2}{n^2}\left(\beta\frac{\sin 2\gamma}{\gamma}\right)^2$." should be -- $B_{system} = \left(\frac{2\alpha\beta\sin^2\gamma}{\gamma^2}\right)^2 + \frac{NA^2}{n^2}\left(\beta\frac{\sin 2\gamma}{\gamma}\right)^2$ --.

Column 5,
Line 55, "N" should be -- n --.

Column 7,
Lines 36 and 37, "N" should be -- n --.
Line 38, in two locations, "N" shoud be -- n --.

UNITED STATES PATENT AND TRADEMARK OFFICE
CERTIFICATE OF CORRECTION

PATENT NO. : 6,650,383 B1
DATED : November 18, 2003
INVENTOR(S) : M. Lu et al.

It is certified that error appears in the above-identified patent and that said Letters Patent is hereby corrected as shown below:

Column 7,
Line 42,

" $M_{SingleLC} \cong -R(a)\left\{I+\left(\frac{\beta_{00}}{\pi}\right)^2\left[\frac{\delta(d\Delta n)}{(d\Delta n)_{00}}-\frac{\delta\lambda}{\lambda_{00}}\right]\begin{pmatrix}i\beta_{00} & a \\ -a & -i\beta_{00}\end{pmatrix}\right\}$, "

should be -- $M_{SingleLC} \cong -R(\alpha)\left\{I+\left(\frac{\beta_{00}}{\pi}\right)^2\left[\frac{\delta(d\Delta n)}{(d\Delta n)_{00}}-\frac{\delta\lambda}{\lambda_{00}}\right]\begin{pmatrix}i\beta_{00} & \alpha \\ -\alpha & -i\beta_{00}\end{pmatrix}\right\}$, --.

Line 47, should be -- n --.

Line 58, " $M_{Single,New} \cong$
$R(-a)\left[-R(a)\left\{I+\left(\frac{\beta_{00}}{\pi}\right)^2\left[\frac{\delta(d\Delta n)}{(d\Delta n)_{00}}-\frac{\delta\lambda}{\lambda_{00}}\right]\begin{pmatrix}i\beta_{00} & a \\ -a & -i\beta_{00}\end{pmatrix}\right\}\right]R(a)$. "

should be -- $M_{Single,New} \cong$
$R(-\alpha)\left[-R(\alpha)\left\{I+\left(\frac{\beta_{00}}{\pi}\right)^2\left[\frac{\delta(d\Delta n)}{(d\Delta n)_{00}}-\frac{\delta\lambda}{\lambda_{00}}\right]\begin{pmatrix}i\beta_{00} & \alpha \\ -\alpha & -i\beta_{00}\end{pmatrix}\right\}\right]R(\alpha)$. --.

Line 66, "A" should be -- $\lambda$ --.

Signed and Sealed this

Seventh Day of September, 2004

JON W. DUDAS
*Director of the United States Patent and Trademark Office*